US009451529B2

(12) United States Patent
Ueda et al.

(10) Patent No.: US 9,451,529 B2
(45) Date of Patent: Sep. 20, 2016

(54) ROUTE INFORMATION EXCHANGE METHOD, COMMUNICATION TERMINAL, AND NON-TRANSITORY COMPUTER-READABLE MEDIUM STORING ROUTE INFORMATION EXCHANGE PROGRAM

(71) Applicant: NEC Corporation, Tokyo (JP)

(72) Inventors: Hirofumi Ueda, Tokyo (JP); Norihito Fujita, Tokyo (JP)

(73) Assignee: NEC Corporation, Tokyo (JP)

( * ) Notice: Subject to any disclaimer, the term of this patent is extended or adjusted under 35 U.S.C. 154(b) by 52 days.

(21) Appl. No.: 14/358,663

(22) PCT Filed: Oct. 18, 2012

(86) PCT No.: PCT/JP2012/006692
§ 371 (c)(1),
(2) Date: May 15, 2014

(87) PCT Pub. No.: WO2013/076912
PCT Pub. Date: May 30, 2013

(65) Prior Publication Data
US 2014/0328338 A1    Nov. 6, 2014

(30) Foreign Application Priority Data
Nov. 21, 2011 (JP) ................. 2011-254259

(51) Int. Cl.
*H04W 40/24* (2009.01)
*H04L 12/751* (2013.01)
(Continued)

(52) U.S. Cl.
CPC ............ *H04W 40/246* (2013.01); *H04L 45/02* (2013.01); *H04L 45/04* (2013.01); *H04W 84/18* (2013.01)

(58) Field of Classification Search
CPC .. H04W 40/246; H04W 84/18; H04L 45/02; H04L 45/04
See application file for complete search history.

(56) References Cited

U.S. PATENT DOCUMENTS

| 6,130,890 | A  | * | 10/2000 | Leinwand | ......... H04L 29/12009 370/389 |
| 7,088,678 | B1 | * | 8/2006 | Freed | ....................... H04L 47/10 370/230 |
| 7,161,897 | B1 | * | 1/2007 | Davies | .................... H04L 45/22 370/217 |
| 7,936,780 | B1 | * | 5/2011 | Kompella | ............. H04L 45/507 370/254 |
| 2002/0069278 | A1 | * | 6/2002 | Forslow | .............. H04L 63/0227 709/225 |
| 2008/0165722 | A1 |   | 7/2008 | Zhang et al. | |

FOREIGN PATENT DOCUMENTS

JP    2003-008588    1/2003
JP    2008-167362    7/2008
(Continued)

OTHER PUBLICATIONS

International Search Report Corresponding to PCT/JP2012/006692, dated Dec. 25, 2012; 2 pages.
(Continued)

*Primary Examiner* — Mohammad Anwar
(74) *Attorney, Agent, or Firm* — Wilmer Cutler Pickering Hale and Dorr LLP

(57) ABSTRACT

Upon receiving a routing control message from another communication terminal (B1), a communication terminal (A1) uses a MANET routing control unit (A133) to update and manage route information when a routing domain described in the routing control message matches the routing domain of the communication terminal (A1) itself. When the communication terminal itself does not belong to the routing domain, the communication terminal uses a DTN routing control unit (A132) to update and manage route information to another routing domain, and uses a route information advertisement unit (A134) to advertise the route information to another routing domain and the routing domain to which the communication terminal (A1) itself belongs, for another communication terminal (B1).

17 Claims, 15 Drawing Sheets

(51) Int. Cl.
*H04L 12/715* (2013.01)
*H04W 84/18* (2009.01)

(56) References Cited

FOREIGN PATENT DOCUMENTS

| | | |
|---|---|---|
| JP | 2008-205890 | 9/2008 |
| JP | 2009-77133 | 4/2009 |
| JP | 2009-218922 | 9/2009 |
| WO | WO-2010/047024 | 4/2010 |

OTHER PUBLICATIONS

X. Hong, et al., "Scalable Routing Protocols for Mobile Ad Hoc Networks", IEEE Network Magazine, Jul.-Aug., 2002; pp. 11-21.
DTN Research Group, "Internet Draft draft-irtf-dtnrg-arch-04.txt", http://www.dtnrg.org/docs/specs/draft-irtf-dtnrg-arch-04.txt; Dec. 2005-Jun. 2006; pp. 1-24.
S. Du et al., "Safari: A Self-Organizing, Hierarchical Architecture for Scalable Ad Hoc Networking", Ad Hoc Netw., pp. 6(4);485-507, 2008.

* cited by examiner

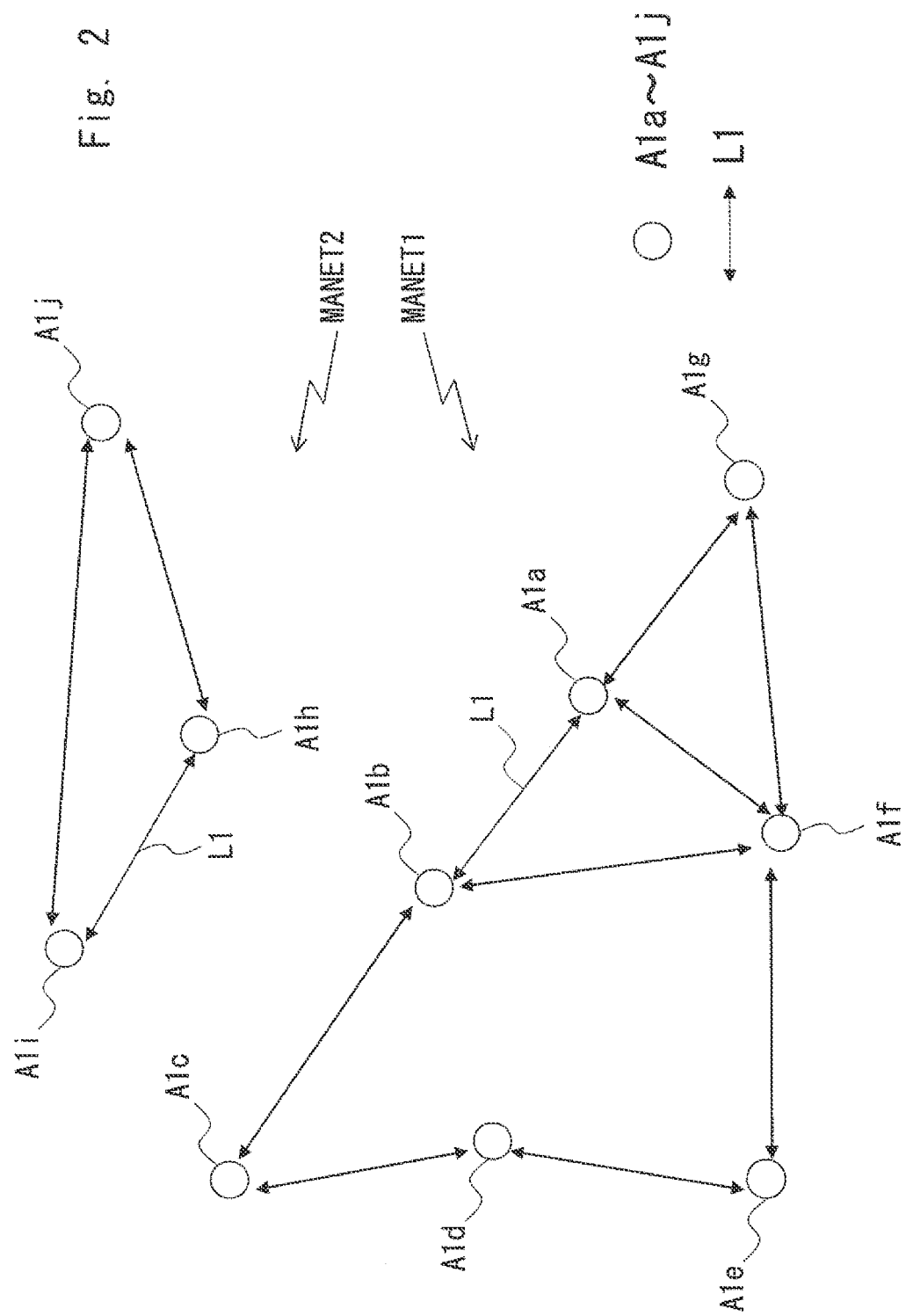

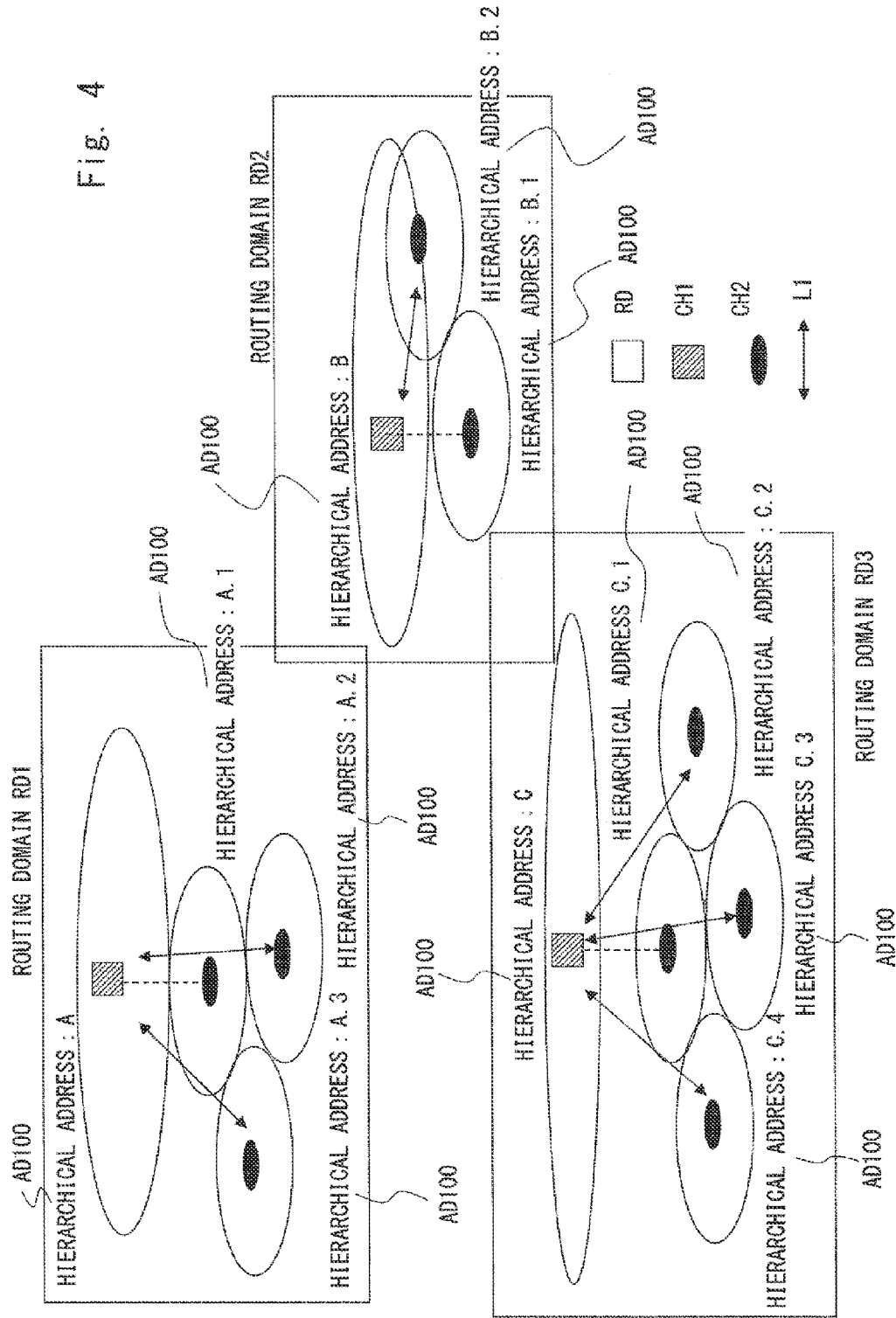

| RT100a | RT100a1 | RT100a2 |

| DESTINATION HIERARCHICAL ADDRESS | Next hop IP ADDRESS |
|---|---|
| A | 192.168.1.1 |
| A.b | 192.168.1.16 |
| A.c | 192.168.2.32 |
| A.b.1 | 192.168.1.16 |
| A.c.1 | 192.168.2.32 |

ADDITION OF ARRIVAL PROBABILITY
TO ROUTE INFORMATION ON ITS OWN ROUTING DOMAIN

RT101a1   RT101a2   RT101a3

| DESTINATION HIERARCHICAL ADDRESS | Next hop | ARRIVAL PROBABILITY |
|---|---|---|
| A | 192.168.1.1 | 0.8 |
| A.1 | 192.168.1.10 | 0.8 |
| A.2 | 191.168.1.10 | 0.9 |
| A.3 | 192.168.1.13 | 0.7 |

UPDATE OF ARRIVAL PROBABILITY OF
ROUTE INFORMATION ON DTN ROUTING

RT101b1   RT101b2   RT101b3

| DESTINATION HIERARCHICAL ADDRESS | Next hop | ARRIVAL PROBABILITY |
|---|---|---|
| C | 192.168.3.1 | 0.6 |
| C.1 | 192.168.3.16 | 0.7 |
| C.2 | 192.168.3.32 | 0.5 |
| C.3 | 192.168.3.16 | 0.4 |
| C.4 | 192.168.3.32 | 0.3 |

RT101b

ROUTE INFORMATION EXCHANGE METHOD, COMMUNICATION TERMINAL, AND NON-TRANSITORY COMPUTER-READABLE MEDIUM STORING ROUTE INFORMATION EXCHANGE PROGRAM

CROSS-REFERENCE TO RELATED APPLICATIONS

This application is a national stage application of International Application No. PCT/JP2012/006692 entitled "Route Information Exchange Method, Communication Terminal and Non-Transitory Computer-Readable Medium Upon Which Route Information Exchange Program Has Been Stored," filed on Oct. 18, 2012, which claims the benefit of the priority of Japanese Patent Application No. 2011-254259, filed on Nov. 21, 2011, the disclosures of each of which are hereby incorporated by reference in their entirety.

TECHNICAL FIELD

The present invention relates to a route information exchange method, a communication terminal, and a non-transitory computer-readable medium storing a route information exchange program. In particular, the present invention relates to a route information exchange method, a communication terminal, and a non-transitory computer-readable medium storing a route information exchange program, which have a mechanism for determining route information to be exchanged, by identifying a plurality of routing domains in the case of exchanging route information among a plurality of routing domains.

BACKGROUND ART

In recent years, mobile ad-hoc networks (MANET) have attracted attention as communication means for use at the time of disasters or in remote areas where network infrastructure has not yet been deployed. As in the case of network infrastructure, there is a demand for implementing mobile ad-hoc networks in a large-scale environment in which a wide range and a large number of communication terminals participate.

In the mobile ad-hoc networks MANET, however, communication terminals directly communicate with each other using wireless communication. Accordingly, the communication radio waves of the communication terminals participating in the network interfere with each other, resulting in limitation of available communication bands. In addition, communication links among the communication terminals can be frequently disconnected, or the communication terminals can be disconnected from the network due to movement of the communication terminals or interruption of communication radio waves by obstacles.

Since a network is constructed of a number of communication terminals, a huge amount of information on routes to a destination communication terminal is necessary for establishing a communication, which results in further narrowing the bands available to each communication terminal.

In the environment in which the available communication bands are narrow and the network can be disconnected, the following conditions are necessary for means to recognize a communication route.

(Condition 1) Scalability for preventing an increase in route information, and
(Condition 2) Robustness of route recognition to tolerate disconnection of a network.

Regarding the former Condition 1, as a mobile ad-hoc network MANET technique, a method is proposed in which the amount of route information is further reduced by constructing a network with a hierarchical structure as disclosed in "Scalable Routing Protocols for Mobile Ad Hoc Networks" by Xiaoyan Hong et al. (Non Patent Literature 1) and "Safari: A self-organizing, hierarchical architecture for scalable ad hoc networking" by Shu Du et al. (Non Patent Literature 2), and another method is proposed in which the amount of route information is further reduced by dynamically assigning addresses used for routing control as disclosed in Non Patent Literature 2.

However, Non Patent Literatures 1 and 2 do not propose any methods that satisfy the latter Condition 2 as well. This is because in the mobile ad hoc networks MANET, communication terminals can constantly and stably communicate with each other via a network connection, and a range in which a route to a destination can be determined by a routing protocol is defined as a routing domain. Therefore, if the network is disconnected, the route to the destination is unknown until each of disconnected routing domains is connected, even when it is attempted to transmit data to a communication terminal belonging to another routing domain. This makes it difficult to communicate with the communication terminal.

On the other hand, as a method that satisfies Condition 2, Delay/Disruption Tolerant Network (DTN) routing technique is proposed as disclosed in "Routing Method and Node" of Japanese Unexamined Patent Application Publication No. 2008-205890 (Patent Literature 1) and "Internet Draft draft-irtf-dtnrg-arch-04.txt" by the DTN Research Group (Non Patent Literature 3). The DTN routing technique has a feature that data to be transferred to a destination is accumulated. The technique involves an operation in which communication terminals that have encountered each other exchange route information on the other communication terminal and deliver the accumulated transfer data to a communication terminal which is most likely to be able to deliver the data to the destination. This enables communication with other desired communication terminals even when the network is disconnected and a plurality of routing domains are present.

However, since a disconnection of a network is assumed from the beginning, the DTN routing technique disclosed in Non Patent Literature 3 employs a mechanism for exchanging route information between the communication terminals that have encountered each other, regardless of routing domain. For this reason, in Non Patent Literature 1 described above, the amount of route information cannot be reduced, unlike in in Non Patent Literature 2, and the route information is held in each communication terminal belonging to the network. As a result, it is impossible to satisfy both of Condition 1 and Condition 2.

In this regard, both of the Conditions 1 and 2 can be satisfied by combining the MANET technique and DTN routing which solve the problems inherent in the route information described above. However, the combination of these two techniques is not sufficient to determine whether to exchange information by reducing the amount of route information based on the MANET technique between adjacent communication terminals, whether to exchange the route information based on DTN routing, and whether the MANET technique or the DTN technique should be executed. Accordingly, the communication terminals that have encountered each other constantly exchange the route information. This makes it difficult to satisfy both of the Conditions 1 and 2.

Under such circumstances, there is a strong demand for implementing a method capable of identifying a plurality of routing domains, determining whether the MANET technique or the DTN routing technique should be executed, and controlling route information to be exchanged in an environment in which a number of communication terminals participate in mobile ad-hoc networks MANET with a narrow band and the network can be disconnected.

CITATION LIST

Patent Literature

[Patent Literature 1] Japanese Unexamined Patent Application Publication No. 2008-205890 (pp. 8-11)

Non Patent Literature

[Non Patent Literature 1] Xiaoyan Hong, Kaixin Xu and Mario Gerla, "Scalable Routing Protocols for Mobile Ad Hoc Networks," IEEE Network Magazine, July-August, 2002, pp. 11-21

[Non Patent Literature 2] Shu Du, Ahamed Khan, Santashil PalChaudhuri, Ansley Post, Amit Kumar Saha, Peter Druschel, David B. Johnson and Rudolf Riedi, "Safari: A self-organizing, hierarchical architecture for scalable ad hoc networking." Ad Hoc Netw., 6(4):485-507, 2008.

[Non Patent Literature 3] DTN Research Group, "Internet Draft draft-irtf-dtnrg-arch-04.txt," http://www.dtnrg.org/docs/specs/draft-irtf-dtnrg-arch-04.txt

DISCLOSURE OF INVENTION

Technical Problem

As described above, the technique of exchanging route information under the environment in which a number of communication terminals participate in the mobile ad-hoc networks MANET with a narrow band and the network can be disconnected has the following problem. That is, it is impossible to achieve both the exchange of route information by reducing the amount of route information by the MANET technique in the routing domain to which the communication terminal itself belongs, and the exchange of route information by the DTN routing technique between communication terminals belonging to different routing domains.

This is because it is impossible for the communication terminals, which are communication counterparts, to identify whether the route information is exchanged between the communication terminals, which exchange route information, in the routing domain to which the communication terminal itself belongs, or whether the route information is exchanged between different routing domains.

Object of Invention

The present invention has been made in view of the above-mentioned problems, and an object of the present invention is to provide a route information exchange method, a communication terminal, and a non-transitory computer-readable medium storing a route information exchange program, which are capable of exchanging route information by the MANET technique in the routing domain to which the communication terminal itself belongs, and exchanging route information by the DTN routing technique between communication terminals belonging to different routing domains.

Solution to Problem

To solve the above-mentioned problems, a route information exchange method, a communication terminal, and a non-transitory computer-readable recording medium storing a route information exchange program according to the present invention mainly employs the following characteristic configurations.

(1) A route information exchange method according to the present invention is a route information exchange method that exchanges, by a communication terminal, route information among a plurality of routing domains, the route information exchange method including: upon receiving, by the communication terminal, a routing control message from another adjacent communication terminal, identifying whether a routing domain to which the other communication terminal belongs is identical with the routing domain of the communication terminal itself; and advertising, to the other communication terminal, route information on a routing domain other than the routing domain to which the other communication terminal belongs, out of route information held in the communication terminal itself, when the routing domain to which the other communication terminal belongs is different from the routing domain of the communication terminal itself.

(2) A communication terminal according to the present invention is a communication terminal having a mechanism for exchanging route information among a plurality of routing domains, the communication terminal including: identification means for identifying, upon receiving a routing control message from another adjacent communication terminal, whether a routing domain to which the other communication terminal belongs is identical with the routing domain of the communication terminal itself; and advertisement means for advertising, to the other communication terminal, route information on a routing domain other than the routing domain to which the other communication terminal belongs, out of route information held in the communication terminal itself, when the routing domain to which the other communication terminal belongs is different from the routing domain of the communication terminal itself.

(3) A non-transitory computer-readable medium storing a route information exchange program according to the present invention causes a computer incorporated in a communication terminal to execute a route information exchange method set forth in at least the above item (1).

Advantageous Effects of Invention

A route information exchange method, a communication terminal, and a non-transitory computer-readable medium storing a route information exchange program according to the present invention can provide the following advantageous effects.

That is, in the routing domain to which the communication terminal itself belongs, route information can be exchanged between communication terminals by the MANET technique. At the same time, the route information can be exchanged by the DTN routing technique between communication terminals belonging to different routing domains. Consequently, both of the above Conditions 1 and 2, namely, that there be scalability for preventing an increase in route information and the robustness of route recognition to tolerate disconnection of a network can be satisfied.

This is because it is possible to determine whether the MANET technique or the DTN routing technique should be used, by identifying whether the communication terminals that exchange route information belong to the same routing domain or different routing domains, and it is also possible to control the route information to be exchanged.

BRIEF DESCRIPTION OF DRAWINGS

FIG. 2 is a network configuration diagram showing an example of a network configuration to which the communication terminal according to the present invention is applied;

FIG. 4 is a conceptual diagram for explaining an outline of dynamic address assignment based on a hierarchical structure as a clustering technique for a mobile ad-hoc network MANET;

FIG. 6 is a MANET route information setting table showing an example of setting of mobile ad-hoc network MANET route information when dynamic address assignment based on a hierarchical structure is carried out;

FIG. 8A is a table showing an example of MANET route information RT101a obtained when an arrival probability is added to route information D302 on its own routing domain;

FIG. 8B is a table showing an example of DTN routing route information RT101b obtained when the arrival probability of route information on DTN routing is updated;

DESCRIPTION OF EMBODIMENTS

Preferred embodiments of a route information exchange method, a communication terminal, and a route information exchange program according to the present invention will be described below with reference to the accompanying drawings. While in the following description, the route information exchange method and the communication terminal according to the present invention will be described, the route information exchange method may be implemented as a route information exchange program that can be executed by a computer. Alternatively, needless to say, the route information exchange program may be recorded in a computer-readable recording medium.

[Description of Configuration Example of Exemplary Embodiment]

Figure 1:
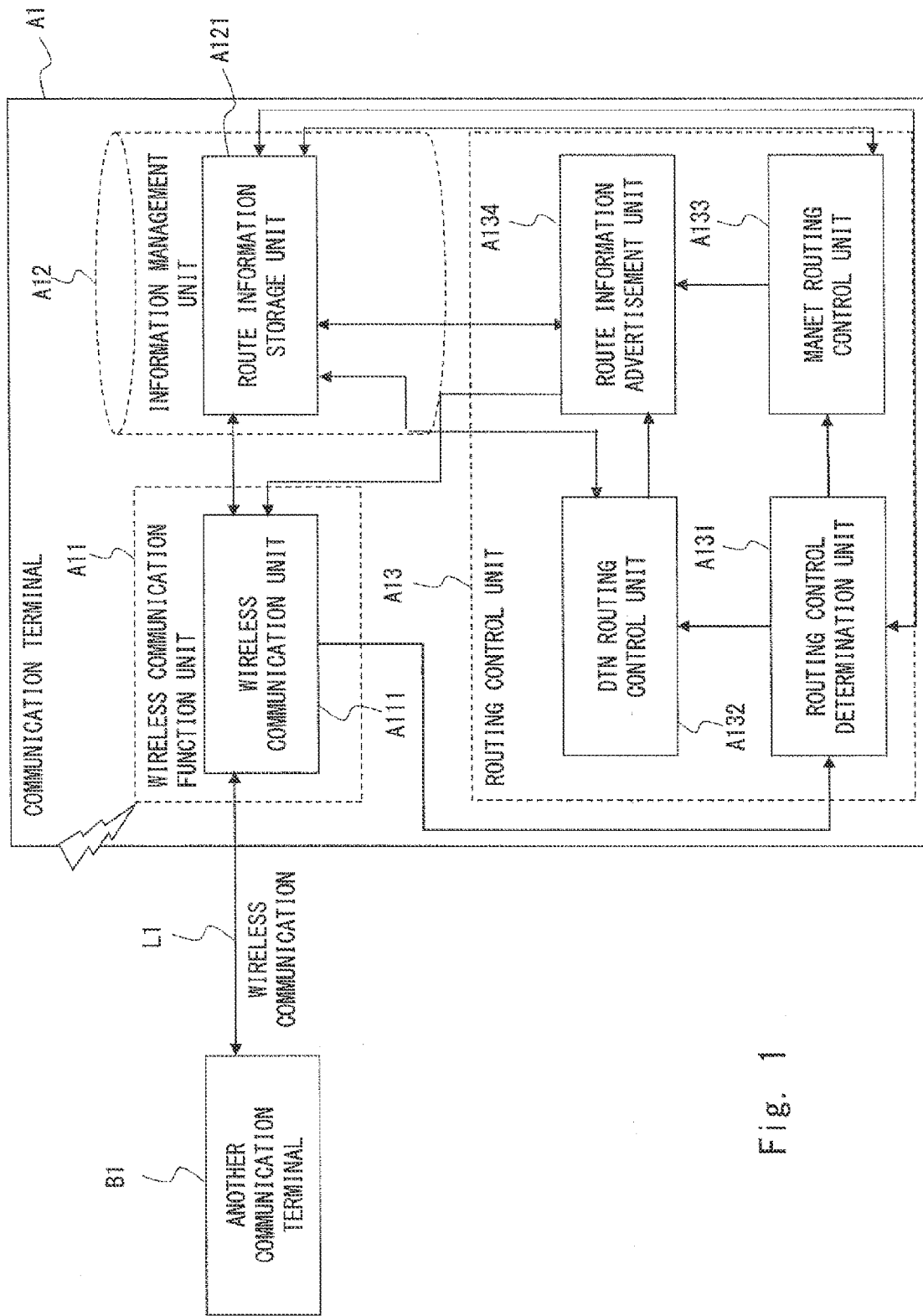
FIG. 1 is a block diagram showing an example of a block configuration of a communication terminal according to the present invention.

First, an example of a block configuration of a communication terminal according to the present invention will be described with reference to FIG. 1. FIG. 1 is a block diagram showing an example of the block configuration of the communication terminal according to the present invention.

A communication terminal A1 shown in FIG. 1 includes at least a wireless communication function unit A11, an information management unit A12, and a routing control unit A13. The wireless communication function unit A11 is a region that includes a wireless communication unit A111 and performs a wireless communication L1 with another communication terminal B1. The information management unit A12 is a region that includes a route information storage unit A121 and manages information held in a communication terminal A1a. The routing control unit A13 is a region that includes a routing control determination unit A131, a DTN routing control unit A132, a MANET routing control unit A133, and a route information advertisement unit A134, and controls route information for communication with a destination communication terminal.

The network configuration diagram of FIG. 2 shows a state where a number of communication terminals A1 each having a block configuration as shown in FIG. 1 are gathered together and perform wireless communication with each other. FIG. 2 is a network configuration diagram showing an example of a network configuration to which the communication terminal according to the present invention is applied. Referring to FIG. 2, communication terminals A1a to A1j each have the block configuration of the communication terminal A1 shown in FIG. 1 and are connected to each other by the wireless communication L1 performed by the wireless communication function unit A11. The communication terminals A1a to A1g constitute a mobile ad-hoc network MANET1, and the communication terminals A1h to A1j constitute a mobile ad-hoc network MANET2. At this time, each of the communication terminals Ala to A1j in the networks of the mobile ad-hoc networks MANET1 and MANET2 may be in a moving state or a stationary state.

Figure 3A:
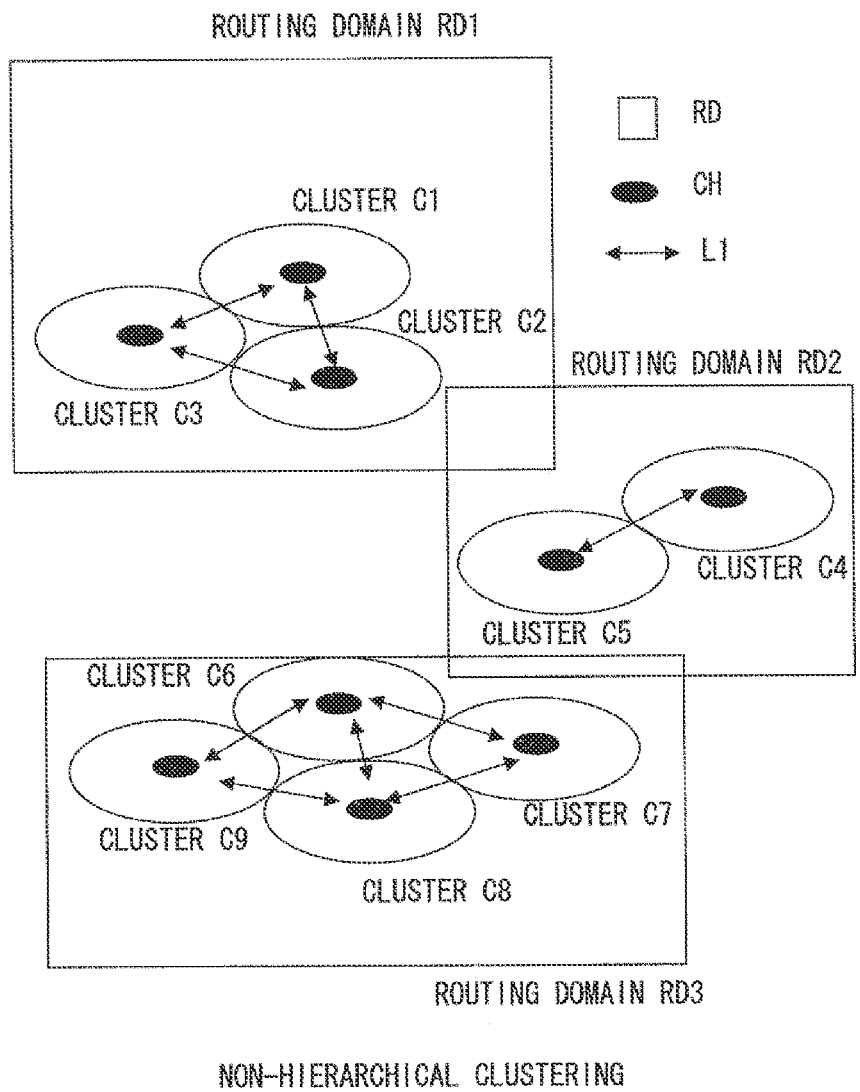
FIG. 3A is a diagram showing a concept of a routing control based on non-hierarchical clustering.
Figure 3B:
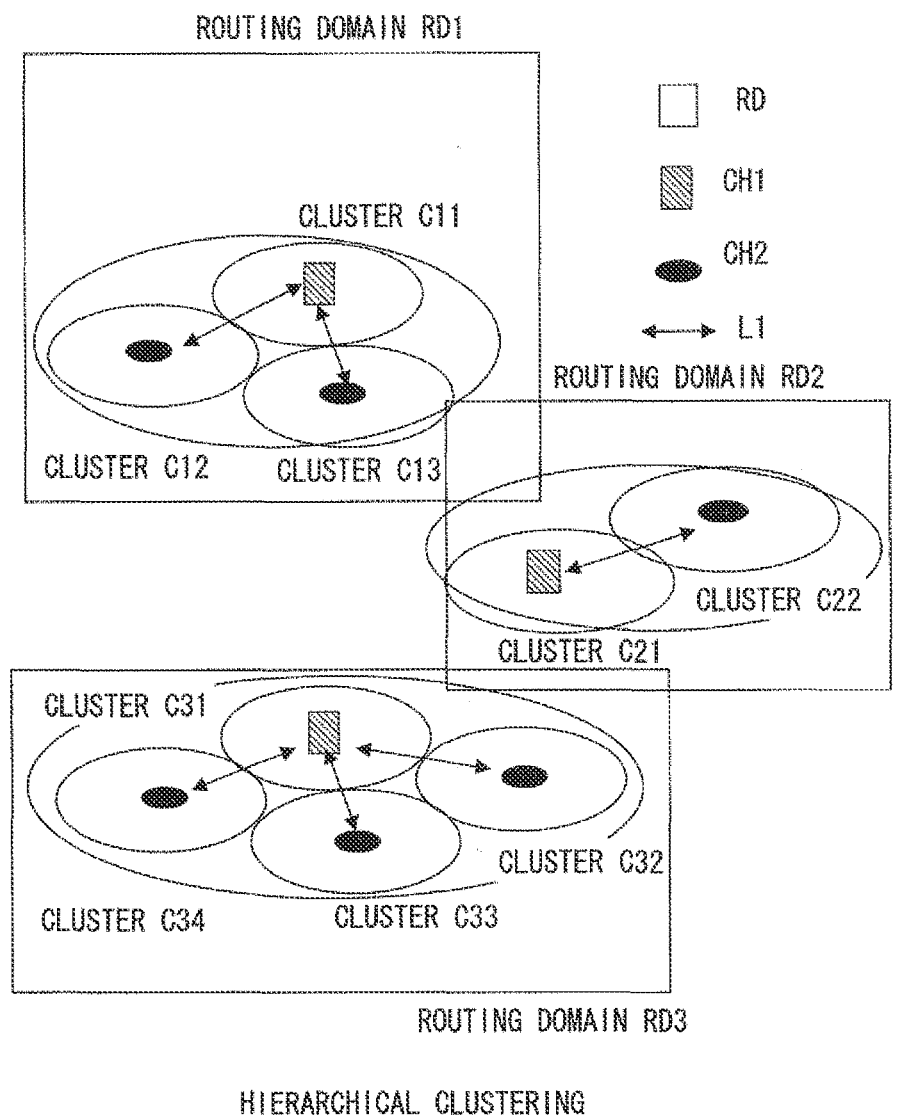
FIG. 3B is a diagram showing a concept of a routing control based on hierarchical clustering.

Further, in each of the mobile ad-hoc networks MANET1 and MANET2, as shown in FIGS. 3A and 3B, a routing control based on non-hierarchical clustering or hierarchical clustering for aggregating and reducing the route information is carried out as a routing control technique for the mobile ad-hoc networks MANET. FIGS. 3A and 3B are conceptual diagrams for explaining an outline of a clustering technique for the mobile ad-hoc networks MANET. FIG. 3A shows the concept of the routing control based on non-hierarchical clustering, and FIG. 3B shows the concept of the routing control based on hierarchical clustering.

Specifically, in the routing control based on non-hierarchical clustering shown in FIG. 3A, cluster heads CH, which are respectively representative of clusters C1, C2, and C3, clusters C4 and C5, and clusters C6, C7, C8, and C9, are connected to each other in a mesh-like manner by the wireless communication L1 in respective routing domains RD1, RD2, and RD, each of which is denoted by reference symbol RD.

On the other hand, in the routing control based on hierarchical clustering shown in FIG. 3B, cluster heads CH, which are respectively representative of clusters C11, C12, and C13, clusters C21 and C22, and clusters C31, C32, C33, and C34, are divided into hierarchical levels including an upper cluster head CH1 and a lower cluster head CH2 in the respective routing domains RD1, RD2, and RD3, each of which is denoted by reference symbol RD. For example, the routing domains RD1, RD2, and RD3 have a hierarchical structure in which the lower cluster heads CH2, which are respectively represented by the clusters C12 and C13, the cluster C22, and the clusters C32, C33, and C34, are not directly connected to each other by the wireless communication L1 and the upper cluster heads CH1, which are respectively represented by the cluster C11, the cluster C21, and the cluster C31, are connected to each other by the wireless communication L1. In the case of logical clusters, the lower cluster heads CH2 are connected to each other by the wireless communication L1 in some cases. Accordingly, the lower cluster heads CH2 are connected to other cluster heads CH2 within at least one of the same routing domains by the wireless communication L1.

Note that the clustering shown in FIGS. 3A and 3B is not limited to clustering for classifying communication terminals within a network, as long as the clustering limits the range of routing control. It is also possible to use clustering in which a control message is provided with a propagation restriction (TTL value: Time To Live), or clustering in which a network for performing a routing control is divided by setting a network address for each communication terminal.

As described above, examples of the clustering include non-hierarchical clustering (the case of FIG. 3A) in which there is no hierarchical relationship between clusters, hierarchical clustering (the case of FIG. 3B) with a hierarchical relationship between clusters, and clustering in which the amount of route information is further reduced by using dynamic address assignment based on the hierarchical structure as shown in FIG. 4. FIG. 4 is a conceptual diagram for explaining an outline of the dynamic address assignment based on the hierarchical structure as a clustering technique for the mobile ad-hoc network MANET.

Specifically, referring to FIG. 4, in each of the routing domains RD1, RD2, and RD3, each of which is denoted by reference symbol RD, the communication terminals to which hierarchical addresses A, B, and C are respectively assigned as a hierarchical address AD100, which is assigned by dynamic address assignment, are each defined as the upper cluster head CH1, and the communication terminals to which hierarchical addresses A.1, A.2, and A.3, hierarchical addresses B.1 and B.2, and hierarchical addresses C.1, C.2, C.3, and C.4 are respectively assigned are each defined as the lower cluster head CH2. Each of the routing domains RD1, RD2, and RD3 has a hierarchical structure in which the lower cluster heads CH2 are not directly connected to each other by the wireless communication L1 and are respectively connected to the upper cluster heads CH1, to which the hierarchical addresses A, B, and C are respectively assigned, by the wireless communication L1. In the case of logical clusters, since the lower cluster heads CH2 are connected to each other by the wireless communication L1, the lower cluster heads CH2 are connected to other cluster heads CH2 within at least one of the same routing domains by the wireless communication L1.

The routing control based on the clustering as described above includes a clustering control message for use in constructing a cluster, and a routing control message for advertising router information within each route domain RD. In this regard, however, out of clustering control messages, a message for selecting and advertising the cluster head CH, the upper cluster head CH1, and the lower cluster head CH2 can also serve as a routing control message for advertising information on a route to the cluster head. Accordingly, though the difference between the clustering control message and the routing control message varies depending on a routing control algorithm based on clustering, both of the messages are messages related to routing control, so in the following description of this exemplary embodiment, just one unified expression, namely, "routing control message D101", will be used to refer to both of these messages.

Figure 5:
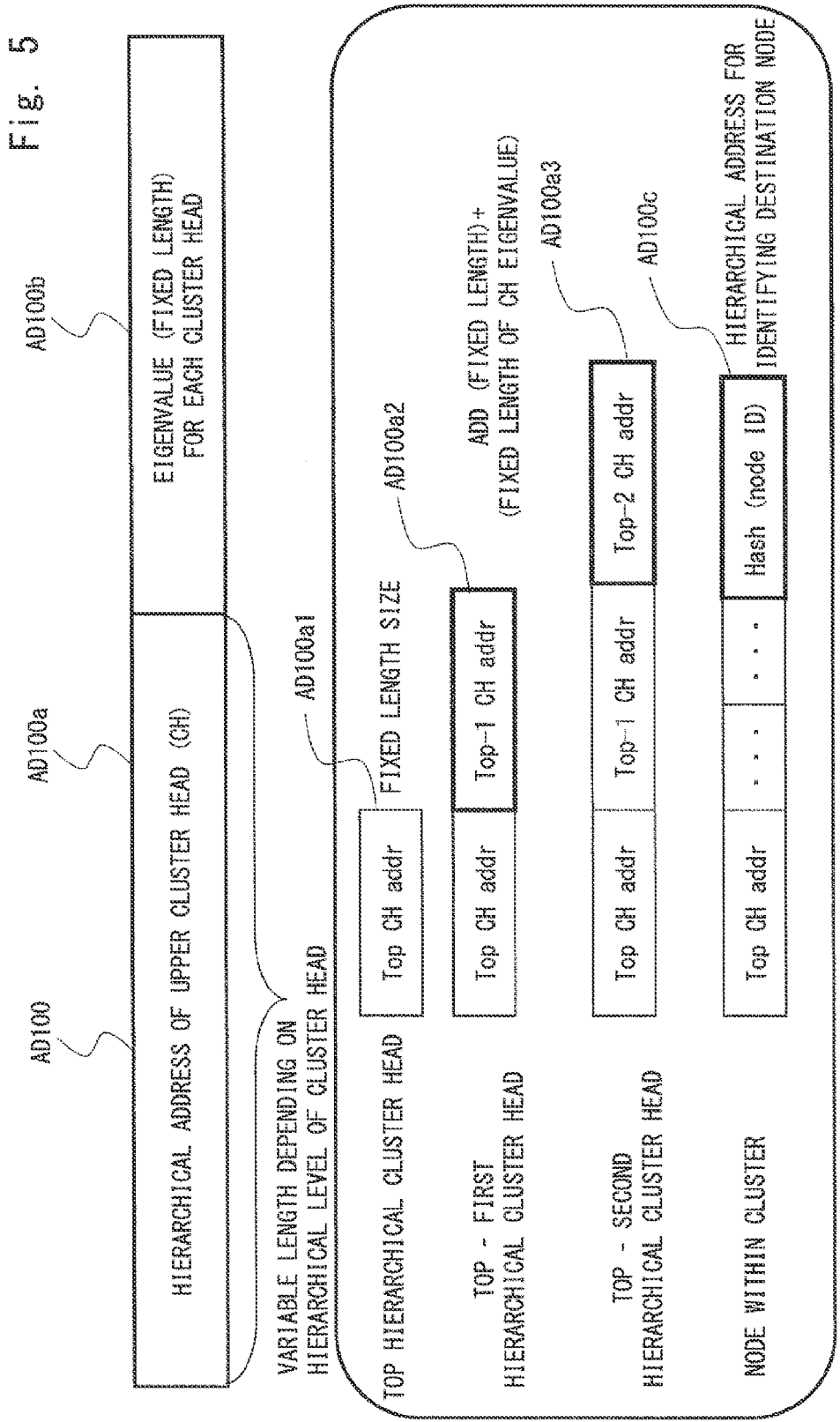
FIG. 5 is an explanatory diagram for explaining a generation rule for dynamic address assignment based on a hierarchical structure in the mobile ad-hoc network MANET.

In the following description of this exemplary embodiment, hierarchical clustering using the dynamic address assignment shown in FIG. 4 will be described by way of example. The hierarchical clustering using the dynamic address assignment has a unique addressing scheme (i.e., the hierarchical address AD100) for each routing domain RD composed of the communication terminals that can be reached by a routing protocol of the mobile ad-hoc network MANET. There is a generation rule, as shown in FIG. 5, for the hierarchical address AD100 in accordance with the hierarchical structure, and the hierarchical address AD100 of the cluster includes a hierarchical address of an upper cluster and is recursively generated from a top cluster head CH. Therefore, the hierarchical address AD100 also serves as an identifier indicating a hierarchical relationship between clusters.

FIG. 5 is an explanatory diagram for explaining the generation rule for the dynamic address assignment based on the hierarchical structure in the mobile ad-hoc network MANET. As shown in FIG. 5, the hierarchical address AD100 includes a hierarchical address AD100$a$ of an upper cluster head CH and an eigenvalue AD100$b$ (fixed length) for each cluster head CH. The hierarchical address AD100$a$ of the upper cluster head has a variable length depending on the hierarchy of the cluster head.

Specifically, as shown in FIG. 5, the top hierarchical cluster head has a fixed length size of a Top CH address AD100$a$1, and a first hierarchical cluster head immediately below the top hierarchical cluster head is given by an address that is obtained by adding a first hierarchical cluster head Top-1 CH address AD100$a$2 (the fixed length of the cluster head eigenvalue) to the Top CH address AD100$a$1 (the fixed length). Further, a second hierarchical cluster head below the first hierarchical cluster head is given by an address that is obtained by adding a second hierarchical cluster head Top-2 CH address AD100$a$3 (the fixed length of the cluster head eigenvalue) to the Top CH address AD100$a$1 (the fixed length) and the first hierarchical cluster head Top-1 CH address AD100$a$2. Note that a node within the cluster for identifying a destination node is given by an address that is obtained by adding a hash AD100$c$, as a node ID, to the end of the hierarchical address of the cluster head CH.

The cluster heads CH that manage each hierarchical level, i.e., the upper cluster heads CH1 and the lower cluster heads CH2, describe the hierarchical address AD100 in the hierarchical level within the routing control message D101 for use in clustering control and routing control, and periodically transmit the routing control message, thereby performing both clustering control and advertisement of route information. The communication terminal having received the routing control message D101 transmitted from the cluster heads CH that manage each hierarchical level, i.e., the upper cluster heads CH1 and the lower cluster heads CH2, creates MANET route information RT100a in the mobile ad-hoc network MANET as shown in FIG. 6 based on the hierarchical address AD100 described in the routing control message D101 and a transmission source (an adjacent communication terminal) of the message. The route information RT100a serves as route information D302 on its own routing domain. FIG. 6 is a MANET route information setting table showing an example of setting of mobile ad-hoc network MANET route information when dynamic address assignment based on the hierarchical structure is carried out.

As the MANET route information RT100a, as shown in the route information setting table of FIG. 6, information on a routing domain (a destination hierarchical address RT100a1 in this exemplary embodiment) or an identifier of a communication terminal as a destination and an IP address RT100a2 of a next hop corresponding to the destination are described. As the route information on its own routing domain, for example, information indicating that the IP address RT100a2 of the next hop is '192.168.1.1' is set when the destination hierarchical address RT100a1 is 'A', and information indicating that the IP address RT100a2 of the next hop is '192.168.1.16' is set when the destination hierarchical address RT100a1 is 'A.b'.

When the communication terminal communicates with another communication terminal, each communication terminal existing on a route to the destination communication terminal repeatedly performs the operation of searching for an entry of route information having a longest match with the hierarchical address AD100 of the destination communication terminal by referring to the MANET route information setting table of FIG. 6 and delivering the data to the communication terminal described in the entry, thereby delivering the data to the destination communication terminal.

As an example similar to the hierarchical address, there is a cluster identifier that is divided into hierarchical levels. Also in a method using the cluster identifier divided into hierarchical levels, the generation procedure is the same as that in the case of the hierarchical address. The routing control using the MANET route information shown in FIG. 6 may be replaced by a routing control based on the cluster identifier divided into hierarchical levels, instead of using the hierarchical address.

Next, in association with the above-described operation, functions of each region of the communication terminal A1 shown in FIG. 1 will be described in detail below. The wireless communication function unit A11 of the communication terminal A1 shown in FIG. 1 includes the wireless communication unit A111. The wireless communication unit A111 has a function of transmitting, to another communication terminal, the routing control message D101 (including the hierarchical address AD100 and the route information D302 of its own routing domain, and route information D202 on another routing domain) received from the information management unit A12 and the route information advertisement unit A134 of the routing control unit A13, and the information to be transmitted to another communication terminal, and a function of receiving these pieces of information from another communication terminal. When the routing control message D101 is received from another communication terminal, the routing control message D101 is delivered to the routing control determination unit A131 of the routing control unit A13.

The information management unit A12 includes the route information storage unit A121. The route information storage unit A121 has a function of recording a routing control message D201 of other routing domains received from the DTN routing control unit A132 of the routing control unit A13, the route information D202 on other routing domains (in this exemplary embodiment, DTN routing route information RT100b, MANET route information RT101a for use in advertising to another communication terminal, and DTN routing route information RT101b for use in advertising to another communication terminal), routing control message D301 of its own routing domain received from the MANET routing control unit A133, and the route information D302 on its own routing domain (in this exemplary embodiment, the mobile ad-hoc network MANET route information RT100a), and a function of returning the corresponding route information or routing control message, upon receiving a request for reading out the route information from the routing control determination unit A131, the DTN routing control unit A132, the MANET routing control unit A133, and the route information advertisement unit A134.

The routing control unit A13 includes the routing control determination unit A131, the DTN routing control unit A132, the MANET routing control unit A133, and the route information advertisement unit A134. The routing control determination unit A131 has the following function. That is, the routing control determination unit A131 receives the routing control message D101 from the wireless communication function unit A11, reads out the route information D302 on its own routing domain from the route information storage unit A121, and compares these pieces of information, thereby identifying whether the message matches the information on its own routing domain or the information on another routing domain. When the identification result shows the information on the routing domain to which the communication terminal itself belongs, the routing control determination unit A131 delivers the corresponding information to the MANET routing control unit A133, and when the identification result shows the information on another routing domain, the routing control determination unit A131 delivers the corresponding information to the DTN routing control unit A132, and switches the routing control to be executed.

The routing control message D101 received from the wireless communication function unit A11 may be identified in such a manner that the route information D302 on its own routing domain to which the communication terminal itself belongs is read out from the route information storage unit A121 and is compared with the information described in the received routing control message D101, to thereby determine whether the information matches the information on the routing domain to which the communication terminal itself belongs. As the method of determining the received routing control message D101 and the information included in the received routing control message D101 and in the route information D302 on its own routing domain, the route information (the MANET route information RT100a, the MANET route information RT101a for use in advertising to another communication terminal, and the DTN routing route information RT101b for use in advertising to another communication terminal), information on a group of communication terminals that manage the hierarchical address AD100, the assigned cluster, and the routing domain, information on a group of managed communication terminals, and the like are assumed and dependent on the routing control algorithm based on clustering for practical use.

Therefore, various methods can be employed as the method for distinguishing the routing domain. In the case of hierarchical clustering using the dynamic address generation in this exemplary embodiment, at least one of the hierarchical address AD100 of the communication terminal itself and the route information RT100a of its own routing domain may be read.

Specifically, in this exemplary embodiment, a hierarchical address is assigned to each communication terminal as described above with reference to FIG. 4, and the upper portion of the hierarchical address includes the hierarchical address (eigenvalue) of the top communication terminal existing in each routing domain. Accordingly, the hierarchical address included in the received routing control message D101, or the hierarchical address included in the route information, may be compared with the hierarchical address AD100 of the communication terminal itself, or the route information RT100a on its own routing domain. When the upper portions of the hierarchical addresses are different, the routing control message may be determined as the routing control message D101 from a different routing domain.

In the case of using other algorithms, for example, when a cluster identifier, which is divided into hierarchical levels, is present instead of a hierarchical address, the cluster identifier described in the routing control message D101 may be compared with the cluster identifier to which the communication terminal itself belongs, as in the case of the dynamic address described above.

Further, the determination may be made based on information on the cluster head CH. Since the route information is aggregated in units of cluster so as to reduce the amount of information as described above, the cluster head CH for managing the route information and the identifier therefor exist. When the identifier of the cluster head CH within the routing domain of the communication terminal itself is recognized in advance and the cluster control message is received from the cluster head CH that is not recognized by the communication terminal itself, the cluster control message may be determined to be the routing control message D101 from a different routing domain.

As a method that does not use any of the identifier, the dynamic address, and the like of the cluster head CH, the following method can be employed. That is, a routing domain identifier is creased in each routing domain and the created routing domain identifier is advertised to each communication terminal within the same routing domain through the routing control message. As in the case of the discrimination method using the hierarchical address described above, the communication terminal can determine a difference in routing domain by using the routing domain identifier.

Similarly, when a network address is assigned in each routing domain, a difference in routing domain may be detected based on the network address described in the routing control message, as in the case of the routing domain identifier described above.

In the manner as described above, the routing control determination unit A131 compares the received routing control message D101 with the route information on its own routing domain, and switches the routing control to the DTN routing control unit A132 when the comparison result indicates the routing control message D201 of another routing domain, and switches the routing control to the MANET routing control unit A133 when the comparison result indicates the routing control message D301 of its own routing domain.

The DTN routing control unit A132 has a function of updating the route information of another routing domain, upon receiving the routing control message D201 of another routing domain, which is different from the routing domain to which the communication terminal itself belongs, from the routing control determination unit A131, and recording, into the route information storage unit A121, the route information described in the received routing control message D201 and the corresponding routing domain.

For example, the DTN routing control unit A132 reads out the route information D202 on another routing domain, which has been recognized up to now, from the route information storage unit A121, and compares the route information with the received routing control message D201 of another routing domain. When the information is different from the routing control message, the hierarchical address described in the received routing control message D201 and the source communication terminal are added to or updated with the route information D202 on another routing domain, as the route information. After that, the DTN routing control unit A132 stores, into the route information storage unit A121, the updated route information, the route information described in the routing control message D201 of another routing domain, and the routing domain.

Figure 7:
FIG. 7 is a DTN routing route information setting table showing an example of setting of DTN routing route information when dynamic address assignment based on a hierarchical structure is carried out.

At this time, various methods can be employed to update the route information D202 on another routing domain. For example, a communication terminal of another routing domain cannot always establish a communication when a communication request is generated, unlike a route to the communication terminal within the routing domain of the communication terminal itself. Accordingly, as in the case of the route management method in the existing delay tolerant network DTN technique, the route information D202 on another routing domain is composed of information including an destination hierarchical address RT100b1 and an IP address RT100b2 of a next hop, as well as an arrival probability RT100b3 as a probability of arrival at the destination from the next hop, as shown in the DTN routing route information RT100b of FIG. 7. FIG. 7 is a DTN routing route information setting table showing an example of setting of the DTN routing route information when dynamic address assignment based on the hierarchical structure is carried out, and showing an example of route information indicating routes to other routing domains.

As shown in the DTN routing route information setting table of FIG. 7, the arrival probability RT100b3 indicating the degree of arrival at the destination, in addition to the information (the destination hierarchical address RT100b1 in this exemplary embodiment) on the routing domain as the destination, or the identifier of the communication terminal, and the IP address RT100b2 of the next hop for the destination. For example, when the destination hierarchical address RT100b1 is 'C.1', the IP address RT100b2 of the next hop is '192.168.3.16' and the arrival probability RT100b3 is '0.8'. When the destination hierarchical address RT100b1 is 'C.4', the IP address RT100b2 of the next hop is '192.168.3.32' and the arrival probability RT100b3 is lowered to '0.4'.

That is, in the case of the communication terminal that has transmitted information from a routing domain different from that to which the communication terminal belongs, the route information RT100b of the DTN routing which tolerates a delay can be managed as a route to the communication terminal that is most likely to be able to deliver data to the source communication terminal of the routing domain. As for a communication with another routing domain, the communication terminal may establish a communication with a routing domain different from that to which the communication terminal belongs, by holding transfer data until the communication terminal that is more likely to deliver data to the destination communication terminal than the communication terminal itself appears. Not only the probability of arrival at the destination communication terminal, but also additional information effective for routing control, such as the number of hops transferred so far, an expiration date of a route entry, and a registration time, may also be used.

The DTN routing control unit A132 has a function of, upon receiving the routing control message D201 of another routing domain, comparing the received routing control message D201 of another routing domain with the routing control message D201 of another routing domain or the route information D202 on another routing domain, which has been recorded so far, and determining whether the route information or routing control message to be advertised to another communication terminal is held in the communication terminal itself and advertises it. For example, when route information on a routing domain different from the routing domain described in the received routing control message D201 is held, these pieces of information, as well as the route information on its own routing domain, can be transmitted to the route information advertisement unit A134 as advertisement information and can be advertised to another communication terminal.

In the case of performing the advertisement, the held routing control message or route information may be directly advertised, or may be transmitted by setting a control flag indicating that the control message for advertisement including the information is not the routing control message used for clustering control, so that the control message for advertisement does not affect the actual clustering control.

Furthermore, in the case of retransmitting the held routing control message D201 or route information D202 on another routing domain, it is also possible to advertise the reliability (i.e., arrival probability RT100b3) of each route described in the DTN routing route information setting table, including those obtained by subtracting an elapsed time from the time when the communication terminal itself has received the information, by a predetermined weight. Also, in the case of advertising the route information D202 on another routing domain and the route information D302 on its own routing domain, as in the case of the route management method in the DTN technique described above, the MANET route information RT101a for use in advertising to another communication terminal and the DTN routing route information RT101b for use in advertising to another communication terminal may be advertised by adding the arrival probability of the route or correcting the arrival probability, as shown in FIG. 8, based on an elapsed time from the time when the information is previously updated.

FIGS. 8A and 8B are explanatory diagrams each showing an example of the network route information on the communication terminal itself to be exchanged with another communication terminal. FIG. 8A shows an example of the MANET route information RT101a obtained when an arrival probability is added to the route information D302 on its own routing domain. FIG. 8B shows an example of the DTN routing route information RT101b obtained when the arrival probability of the DTN routing route information shown in FIG. 7 is updated. In the MANET route information RT101a to be advertised to another communication terminal shown in FIG. 8A, an arrival probability RT101a3 is further added to a destination hierarchical address RT101a1 and route information on an IP address RT101a2 of the next hop, and these are transmitted. On the other hand, in the DTN routing route information RT101b to be advertised to another communication terminal shown in FIG. 8B, a destination hierarchical address RT101b1 and an IP address RT101b2 of the next hop, as well as an arrival probability RT101b3 obtained by updating the arrival probability shown in FIG. 7, are transmitted as route information.

Various methods can be employed as a method for determining information to be advertised to another communication terminal. For example, in the case of reducing the amount of information to be exchanged, it is possible to employ a method of delivering only the MANET route information RT100a or the MANET route information RT101a for use in advertising to another communication terminal as the routing control message of the routing domain to which the communication terminal itself belongs, and a method of selecting and delivering at least one piece of information, instead of delivering all the route information on routing domains different from the routing domain of the received routing control message.

For example, as shown in FIGS. 7, 8A, and 8B, when the routes to different routing domains are managed using the route information based on a probability, only the information on routs that are assumed to be effective routes at present, i.e., only the route information indicating a value equal to or greater than a predetermined threshold, for example, an arrival probability equal to or greater than '0.6', may be advertised to another communication terminal as advertisement information D102. Alternatively, to enable recognition of a large number of routes, all the routing control messages and route information on routing domains different from the routing domain of the received routing control message, out of the information held in the route information storage unit A121, may be advertised to another communication terminal as the advertisement information D102.

The MANET routing control unit A133 has a function of controlling routes within each routing domain based on the routing control message D101 received from the route information determination unit A131. In this exemplary embodiment, since the routing control algorithm based on clustering is used, it is necessary to transmit the routing control message D101 to another communication terminal when the information on the hierarchical structure is updated. Accordingly, the routing control message D101 and an advertisement request are transmitted as the advertisement information D102 to the route information advertisement unit A134.

The MANET routing control unit A133 also has a function of updating the route information on its own routing domain, upon receiving, from the determination unit A131, the routing control message D301 of its own routing domain to which the communication terminal itself belongs, and storing, into the route information storage unit A121, the route information described in the routing control message D301 and the routing domain thereof.

For example, the MANET routing control unit A133 reads out, from the route information storage unit A121, the route information D302 on its own routing domain to which the communication terminal itself belongs, and adds and updates the corresponding entry by using the routing control message D301, thereby managing the route information D302 on its own routing domain. Specifically, in this exemplary embodiment, the MANET route information RT100a shown in the route information setting table of FIG. 6 is updated. In this case, the updated route information D302 on its own routing domain is delivered and stored into the route information storage unit A121. When the route information is updated and there is a need to advertise the route information to another communication terminal within the routing domain to which the communication terminal itself belongs, the updated route information and an advertisement request are transmitted as the advertisement information D102 to the route information advertisement unit A134.

The route information advertisement unit A134 has a function of periodically transmitting, to another communication terminal, the routing control message D101 for recognizing routes within the routing domain, through the wireless communication unit A111, and a function of generating the routing control message D101 including the advertisement information D102, upon receiving the route information and the advertisement request as the advertisement information D102 from the DTN routing control unit A132 and the MANET routing control unit A133, and advertising it to another communication terminal through the wireless communication unit A111.

As the advertisement information D102 for another communication terminal, the route information advertisement unit A134 may read out the information, which is indicated by the DTN routing control unit A132 and the MANET routing control unit A133, from the route information storage unit A121, and may advertise it to another communication terminal through the wireless communication unit A111.

[Description of Operation of Exemplary Embodiment]

Figure 9:
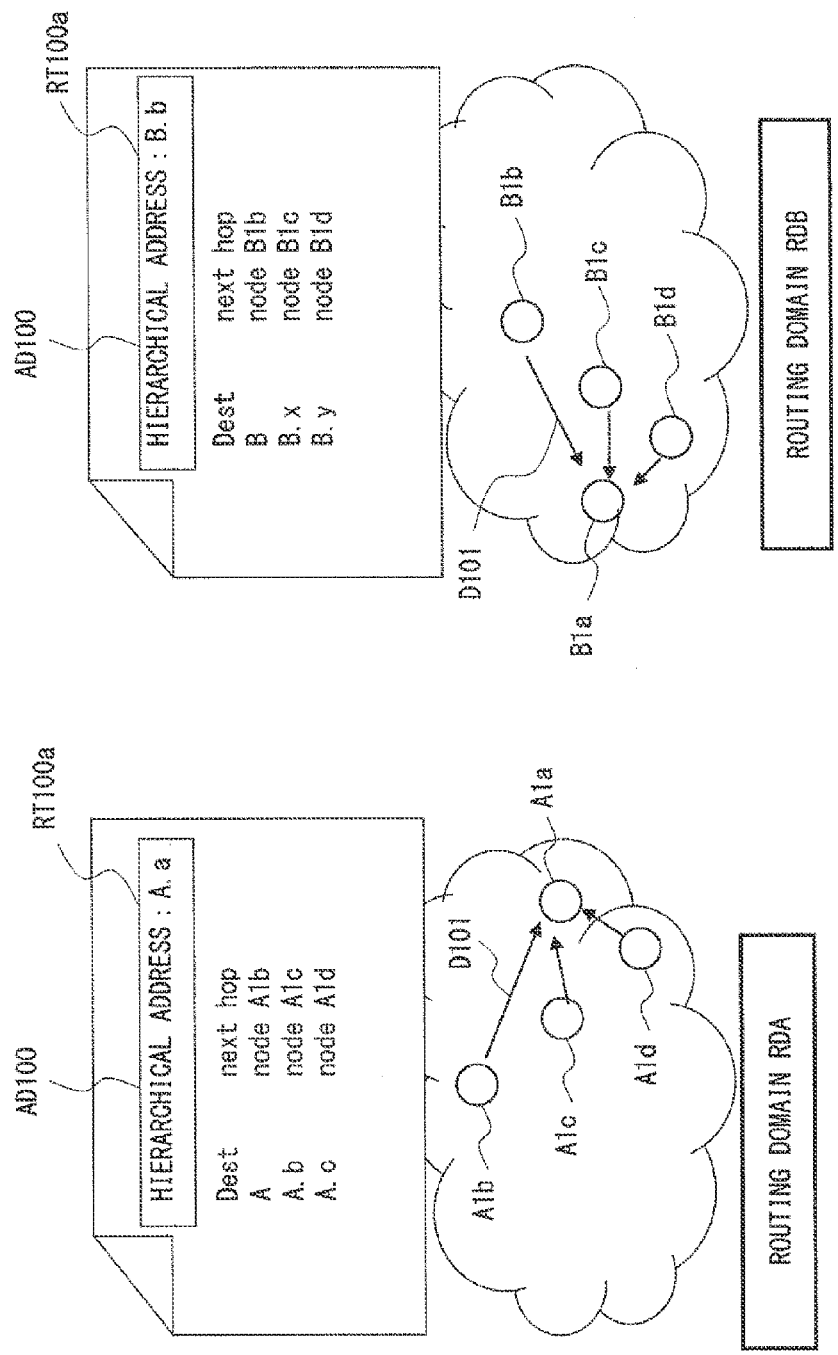
FIG. 9 is a schematic diagram showing a configuration of a network before being changed and a setting state of route information according to an exemplary embodiment of the present invention.

Referring next to FIGS. 9 to 12, an operation of exchanging the route information among a plurality of routing domains according to this exemplary embodiment will be described. FIG. 9 is a schematic diagram showing a configuration of a network before being changed and a setting state of route information according to an exemplary embodiment of the present invention.

In the schematic diagram shown in FIG. 9, assume that communication terminals A1a to A1d exist in a range in which the communication terminals can communicate with each other by relaying and transferring data between the communication terminals and the communication terminals form a routing domain RDA. Also assume that communication terminals B1a to B1d form a routing domain RDB. Although there are a number of communication terminals within a routing domain in a normal situation, the description thereof is abbreviated and simplified in this exemplary embodiment, for ease of explanation. In addition, a description of routing domains other than the necessary minimum number of routing domains is omitted.

In each of the routing domains RDA and RDB, a hierarchical structure is formed. In each hierarchical structure, hierarchical address assignment is carried out and a routing control message including a hierarchical address is transmitted. Then the communication terminal A1a of the routing domain RDA and the communication terminal B1a of the routing domain RDB each receive the routing control message of the corresponding routing domain, and recognize route information as shown in the upper portion of FIG. 9 and information on the hierarchical address of the communication terminal itself.

Specifically, the communication terminal A1a of the routing domain RDA recognizes the MANET route information RT100a indicating that the hierarchical address AD100 of the communication terminal itself is 'A.a' and also indicating that, as the route information, the next hop for the destination 'A' is 'node A1b'; the next hop for the destination 'A.b' is 'node A1c'; and the next hop for the destination 'A.c' is 'node A1d', and holds the information in the route information storage unit A121. The communication terminal B1a of the routing domain RDB recognizes the MANET route information RT100a indicating that the hierarchical address AD100 of the communication terminal itself is 'B.b' and also indicating that, as the route information, the next hop for the destination 'B' is 'node B1b'; the next hop for the destination 'B.x' is 'node B1c'; and the next hop for the destination 'B.y' is 'node B1d', and holds the information in the route information storage unit A121.

Figure 10A:
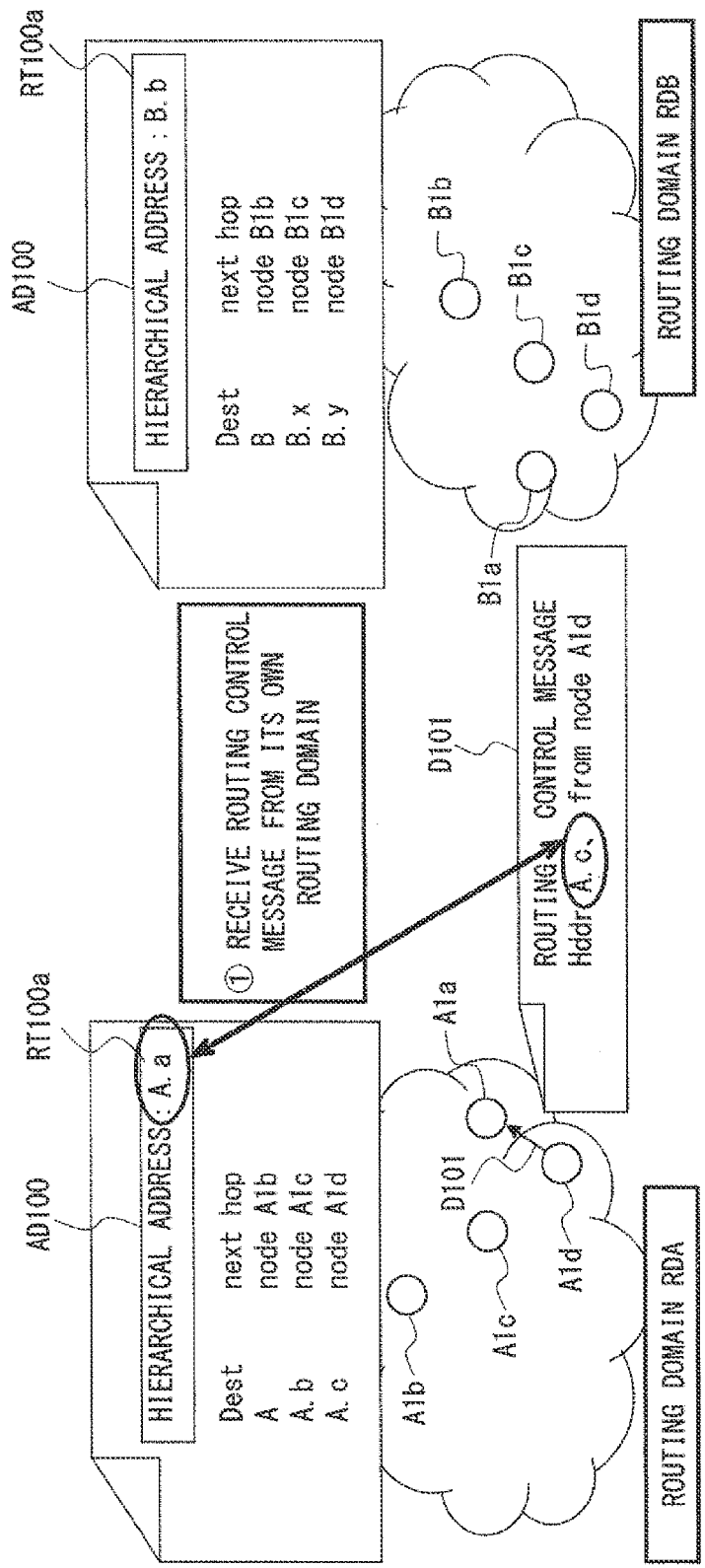
FIG. 10A is a diagram showing a state where a communication terminal A1a updates route information, upon receiving a routing control message from a communication terminal A1d within its own routing domain RDA.
Figure 10B:
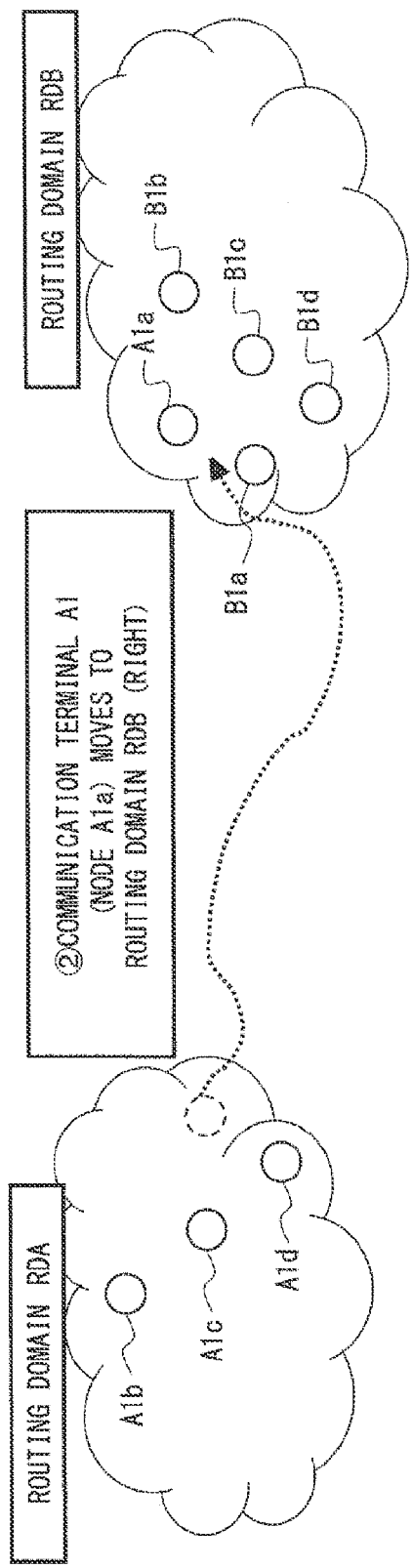
FIG. 10B is a diagram showing a state where the communication terminal A1a of the routing domain RDA has moved to a routing domain RDB.

Under the circumstances described above, the operation in which the communication terminal A1a shown in FIG. 9 determines the method for exchanging the route information in the routing domain RDA and the method for exchanging the route information thereafter when the communication terminal moves from the routing domain RDA to the routing domain RDB will be described with reference to FIGS. 10A, 10B, 11A, 11B, and 12. FIGS. 10A and 10B are schematic diagrams each showing an example of a procedure for updating the route information on its own routing domain according to an exemplary embodiment of the present invention. FIG. 10A shows a state where the communication terminal A1a updates the route information, upon receiving the routing control message from the communication terminal A1d within its own routing domain RDA. FIG. 10B shows a state where the communication terminal A1a of the routing domain RDA has moved to the routing domain RDB.

Figure 11A:
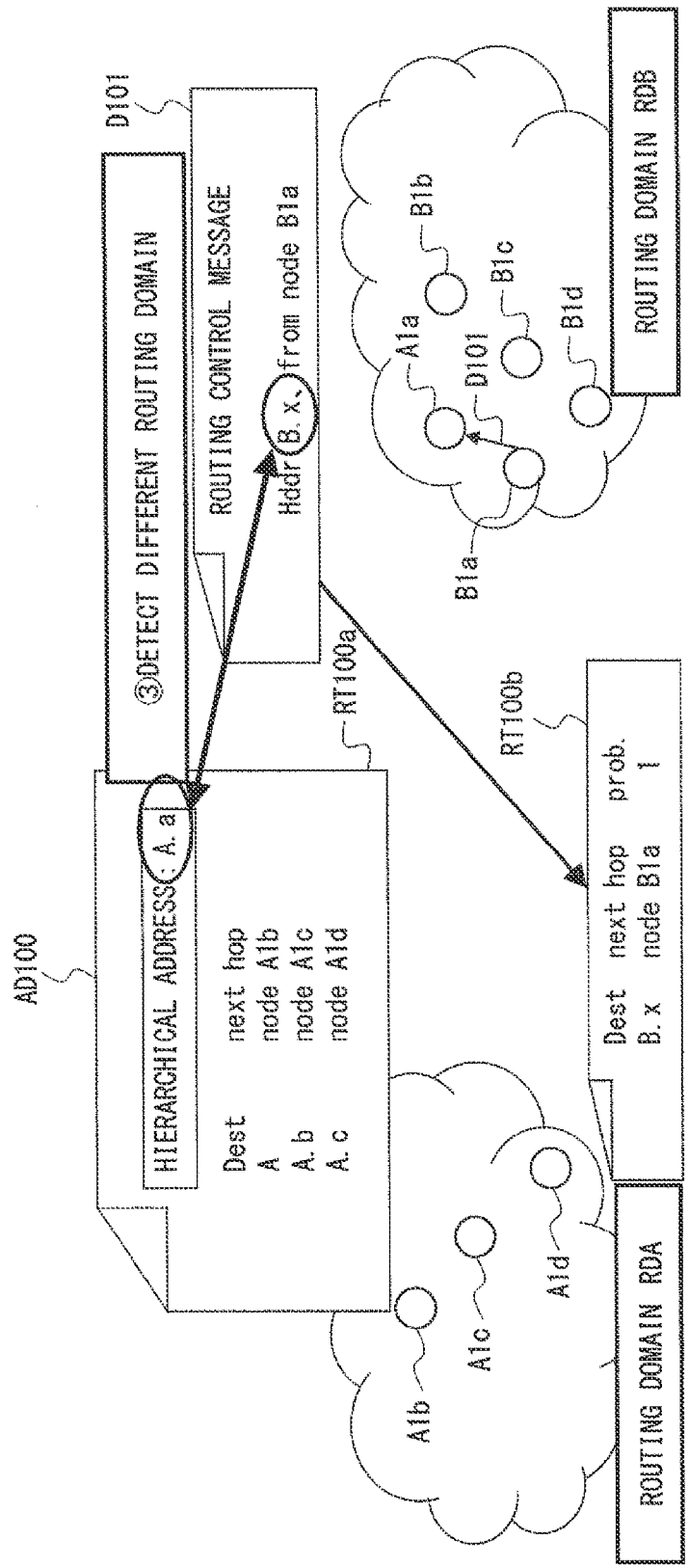
FIG. 11A is a schematic diagram showing an example of a procedure for advertising route information between routing domains according to an exemplary embodiment of the present invention.
Figure 11B:
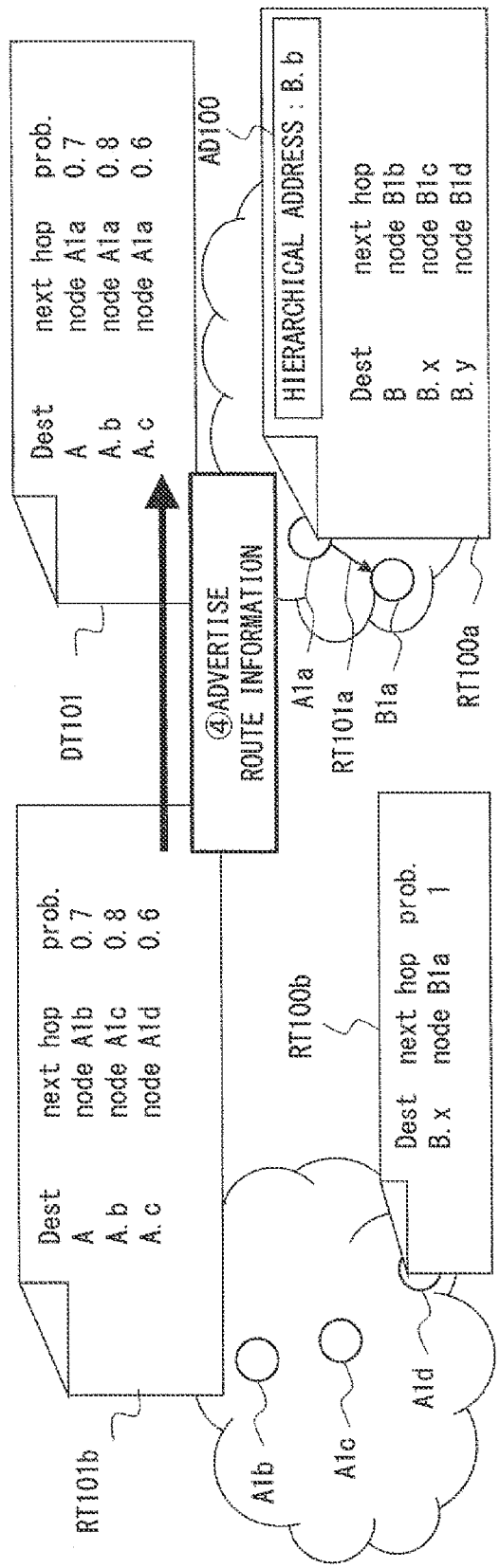
FIG. 11B is a schematic diagram showing an example of a procedure for advertising route information between routing domains according to an exemplary embodiment of the present invention.

FIGS. 11A and 11B are schematic diagrams each showing an example of a procedure for advertising route information between routing domains according to an exemplary embodiment of the present invention. FIG. 11A shows a state where the communication terminal A1a, which has moved to the routing domain RDB in FIG. 10B, updates the route information, upon receiving the routing control message from the communication terminal B1a within the destination routing domain RDB. FIG. 11B shows a state where the communication terminal A1a, which has received the routing control message from the communication terminal B1a, recalculates an arrival probability indicating the degree of arrival at each destination communication terminal, which is held in the route information RT100a on its own routing domain RDA, creates the DTN routing route information RT101b obtained by adding the arrival probability to the routing information RT100a on its own routing domain RDA, and advertises it to the communication terminal B1a as the advertisement information D102.

Figure 12:
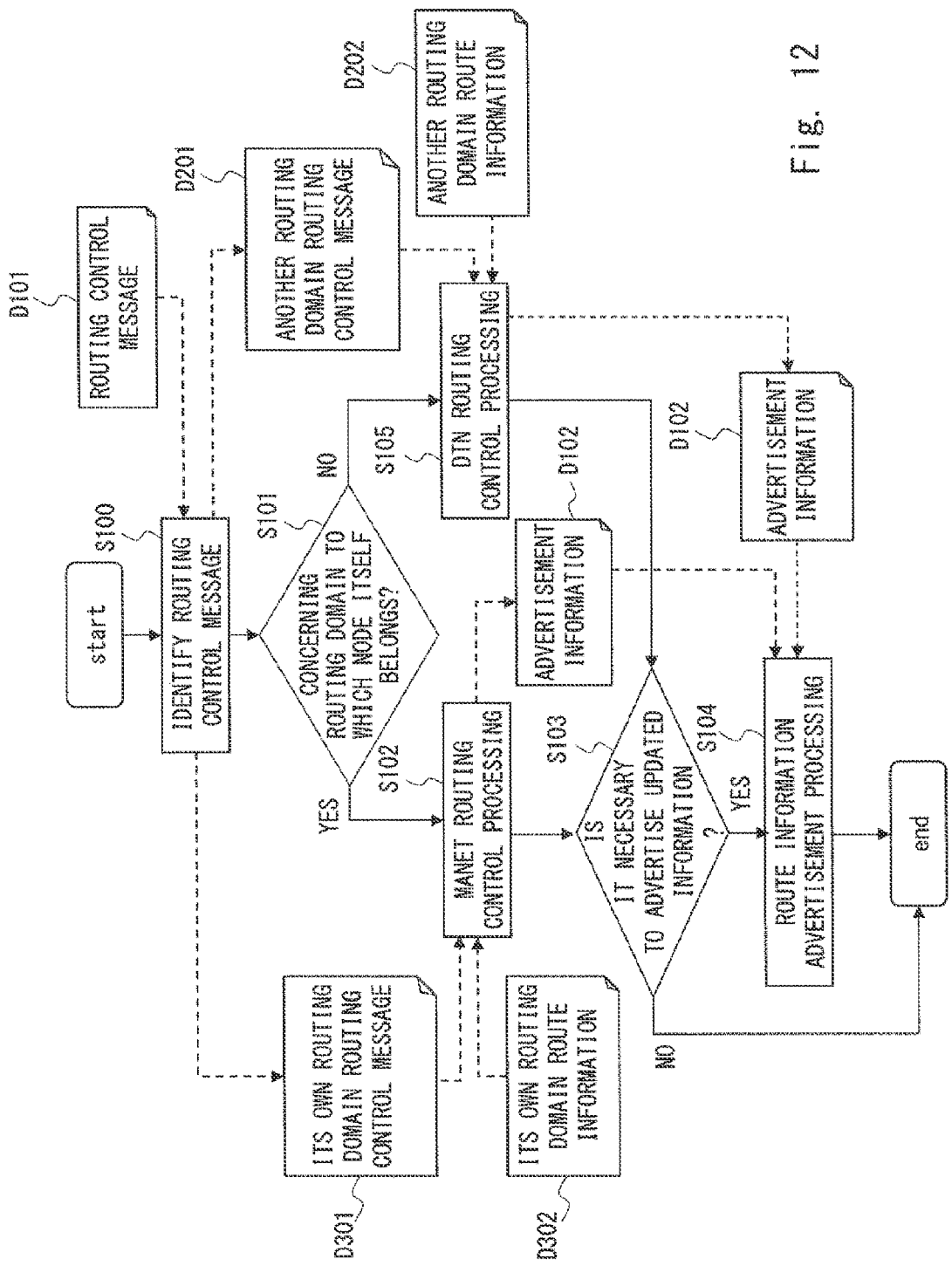
FIG. 12 is a flowchart showing an example of a flow of an operation of a communication terminal according to an exemplary embodiment of the present invention.

FIG. 12 is a flowchart showing an example of a flow of the operation of the communication terminal according to an exemplary embodiment of the present invention. An example of the route information exchange method according to the present invention will be described in detail below with reference to the schematic diagrams of FIGS. 10A, 10B, 11A, and 11B in accordance with the flowchart shown in FIG. 12.

In the flowchart shown in FIG. 12, upon receiving the routing control message D101 from the communication terminal A1d within the routing domain RDA to which the communication terminal A1a belongs, the communication terminal A1a in the state shown in FIG. 10A uses the routing control determination unit A131 to perform processing of identifying the received routing control message D101 and starts advertisement processing to another communication terminal (step S100).

Specifically, in step S100, which is the first processing, the communication terminal A1a uses the routing control determination unit A131 to identify whether the routing control message D101 received through the wireless communication unit A111 indicates information on the routing domain to which the communication terminal itself belongs, by using the route information D302 on its own routing domain. In this exemplary embodiment, each communication terminal recognizes the hierarchical address AD100 (the hierarchical address AD100 of the communication terminal A1a is 'A.a' as shown in FIG. 10A) of the cluster to which the communication terminal itself belongs. On the other hand, as shown in FIG. 10A, 'A.c' is described as a hierarchical address in the routing control message D101 received by the communication terminal A1a.

Therefore, as indicated by the double-headed arrow in FIG. 10A, the communication terminal A1a compares the hierarchical address 'A.a', which is recognized by itself, with the hierarchical address 'A.c', which is described in the received routing control message D101, to thereby determine whether the message matches the routing control message of the routing domain RDA itself (step S101). At this time, the upper portion 'A' of the hierarchical address described in the received the routing control message D101 is the same as the upper portion 'A' of the hierarchical address AD100 which is recognized by the communication terminal A1a. Accordingly, it is determined that the message indicates information on the routing domain RDA to which the communication terminal A1a itself belongs (Yes in step S101), and the routing control determination unit A131 determines the routing control message D101 to be the routing control message D301 of its own routing domain RDA and sends it to the MANET routing control unit A133 as shown in the flowchart of FIG. 12. Then the communication terminal A1a executes the next step S102.

In step S102, the communication terminal A1a updates the route information on the routing domain RDA to which the communication terminal A1a itself belongs, by using the MANET routing control unit A133 (step S102). The MANET routing control unit A133 updates the route information and performs hierarchical structure updating processing, by using the routing control message D301 of its own routing domain RDA received from the routing control determination unit A131 and the route information D302, which is read from the route information storage unit A121, on its own routing domain RDA to which the current communication terminal A1a itself belongs. Further, the updated route information is recorded in the route information storage unit A121.

Furthermore, the MANET routing control unit A133 determines whether the route information or the hierarchical structure is changed and it is necessary to advertise updated information (step S103). If the route information or the hierarchical structure is not changed, there is no need to advertise the updated information (No in step S103). Accordingly, the communication terminal A1a terminates the processing for the routing control. In this exemplary embodiment, the hierarchical address 'A.c' described in the received routing control message D101 and the source communication terminal A1d are already registered as the route information as shown in the MANET route information RT100a of FIG. 10A. Therefore, it is determined that there is no changed information to be advertised to another communication terminal, and updating of the route information is finished.

On the other hand, when it is determined that the route information or the hierarchical structure is changed and it is necessary to advertise updated information (Yes in step S103), the MANET routing control unit A133 of the communication terminal A1a sends, to the route information advertisement unit A134, the updated route information or routing control message including information, such as the route information RT100a on its own routing domain shown in the upper left portion of FIG. 10A, as the advertisement information D102, and the communication terminal A1a executes the next step S104.

In step S104, the communication terminal A1a uses the route information advertisement unit A134 to advertise, to another communication terminal, the advertisement information D102 received from the MANET routing control unit A133 (step S104). Specifically, the route information advertisement unit A134 creates the routing control message D101 including the information received as the advertisement information D102 from the MANET routing control unit A133, advertises the updated route information to another communication terminal through the wireless communication unit A111, and terminates the processing for the routing control.

In the manner as described above, the route information D302 on its own routing domain RDA to which the communication terminal A1a itself belongs is updated and managed. Next, a procedure for managing information on routes to other different routing domains will be described with reference to the schematic diagrams of FIGS. 10B, 11A, and 11B in accordance with the flowchart shown in FIG. 12.

Assume herein that, as shown in FIG. 10B, the communication terminal A1a moves from the routing domain RDA to the routing domain RDB. After that, upon receiving the routing control message D101 transmitted from the communication terminal B1a of the routing domain RDB, the communication terminal A1a identifies the received routing control message D101 in the route information determination unit A131 (step S100).

In this exemplary embodiment, as shown in FIG. 11A, the hierarchical address AD100 of the communication terminal A1a itself, which is recognized by the communication terminal A1a, is 'A.a', and the upper portion thereof is 'A'. On the other hand, as shown in FIG. 11A, 'B.x' is described as a hierarchical address in the routing control message D101 received from the communication terminal B1a. Accordingly, the upper portion 'A' of the hierarchical address AD100 of the communication terminal A1a itself is different from the upper portion 'B' of the hierarchical address within the received routing control message D101.

For this reason, as indicated by the double-headed arrow in FIG. 11A, the communication terminal A1a compares the hierarchical address 'A.a', which is recognized by itself, with the hierarchical address 'B.x', which is described in the received routing control message D101, to thereby determine whether the message matches the routing control message of the routing domain RDA itself (step S101). At this time, the upper portion 'B' of the hierarchical address described in the received routing control message D101 is different from the upper portion 'A' of the hierarchical address AD100 recognized by the communication terminal A1a. Accordingly, it is then determined that the routing control message indicates another routing domain RDB which is different from the routing domain RDA to which the communication terminal A1a itself belongs (No in step S101), and as shown in the flowchart of FIG. 12, the routing control determination unit A131 determines the routing control message D101 to be the routing control message D201 of another routing domain RDB and sends it to the DTN routing control unit A132. Further, the communication terminal A1a executes the next step S105.

In step S105, the communication terminal A1a uses the DTN routing control unit A132 to update the route information on other routing domains as shown in the DTN routing route information RT100b of FIG. 11A, based on the route information D202 on another routing domain stored in the route information storage unit A121, and the routing control message D201 of another routing domain received from the route information determination unit A131 (step S105).

After that, the DTN routing control unit A132 determines whether information on a route to another routing domain, which is to be advertised to another communication terminal B1a, is held in the communication terminal A1a itself (step S103). When the information on a route to another routing domain, which is to be advertised to another communication terminal B1a, is not held (No in step S103), the communication terminal A1a terminates the processing for the routing control.

On the other hand, when the information on a route to another routing domain, which is to be advertised to another communication terminal B1a, is held (Yes in step S103), the DTN routing control unit A132 of the communication terminal A1a further recalculates an arrival probability for the MANET route information RT101a on the communication terminal within its own routing domain RDA, to thereby create the DTN routing route information RT101b to be advertised to another communication terminal, and sends, to the route information advertisement unit A134, route information or a routing control message including information, such as the DTN routing route information RT101b shown in the upper left portion of FIG. 11B, as the advertisement information D102. The communication terminal A1a executes the above-mentioned step S104.

In this exemplary embodiment, as shown in FIG. 11B, the communication terminal A1a determines the route information RT101a on its own routing domain including the hierarchical address AD100, which does not match the hierarchical address 'B.x' described in the received routing control message D201 of another routing domain RDB, as the information to be advertised to another communication terminal B1a as the route information RT101b on another routing domain. Then the communication terminal A1a delivers, to the route information advertisement unit A134, the DTN routing route information RT101b including the result obtained by recalculating a probability of an arrival at a destination described in the route information on the routing domain RDA, as the advertisement information D102. The communication terminal A1a executes step S104.

In step S104, the communication terminal A1a uses the route information advertisement unit A134 to describe, in the routing control message, the advertisement information D102 received from the DTN routing control unit A132 as shown in FIG. 11B, and advertises it to another communication terminal B1a through the wireless communication unit A111 (step S104). Specifically, the route information advertisement unit A134 creates the routing control message D101 including the DTN routing route information RT101b received as the advertisement information D102 from the DTN routing control unit A132, advertises it to another communication terminal B1a through the wireless communication unit A111, and terminates the processing for the routing control.

The communication terminal B1a of the routing domain B, which has received, from the communication terminal A1a, the routing control message D101 including the route information on the routing domain RDA, receives, from another routing domain (communication terminal A1a), the routing control message D101 including the route information on the routing domain RDA including a hierarchical address different from that of the communication terminal D1a itself. Accordingly, as in the case of the communication terminal A1a, the DTN routing control unit A132 is used to execute the processing of the above-mentioned step S105 and update the route information held in the communication terminal B1a itself with route information as shown in the DTN routing route information RT101b of FIG. 11B which is described in the received routing control message D101.

In the same manner as in the procedure in which the communication terminal A1a advertises the route information, the communication terminal B1a creates the DTN routing route information RT101B to be advertised to another communication terminal A1a based on the MANET route information RT100a within its own routing domain RDB and the received routing control message D101, and advertises the route information to another communication terminal Ala, thereby exchanging the route information between the routing domains RDA and RDB.

In the manner as described above, the communication terminal A1a performs the routing control based on clustering in the routing domain RDA to which the communication terminal A1a itself belongs, thereby making it possible to reduce the route information. On the other hand, when the communication terminal comes into contact with another routing domain different from the routing domain RDA, for example, the routing domain RDB, a hierarchical address is used for routing domain information in this exemplary embodiment. This makes it possible to determine whether there is information to be exchanged, and to reduce the amount of route information to be exchanged.

This exemplary embodiment illustrates an example in which the routing control having the feature of the mobile ad-hoc network MANET technique (i.e., a reduction in routing control) as well as the feature of the DTN routing technique (i.e., the robustness to recognize a route) is implemented as a routing control of a network, by using the routing control determination unit A131 of the present invention. In this case, the routing control based on clustering is used as an algorithm for the MANET routing control unit A133 in this exemplary embodiment described above, but other routing control algorithms may also be used. The use of other routing control algorithms different from the routing control algorithm based on clustering enables the application of the present invention to an implementation of a routing control having the feature of the MANET technique as well as the feature of the DTN routing technique, which is different from that illustrated in this exemplary embodiment.

The configurations according to preferred embodiments of the present invention have been described above. However, note that the exemplary embodiments of the present invention are illustrated by way of example only, and are not intended to limit the present invention. It is easily understood by those skilled in the art that the present invention can be modified in various manners depending on specific purpose, without departing from the gist of the present invention.

In the above exemplary embodiments, the present invention has been described as a hardware configuration, but the present invention is not limited to this. According to the present invention, any processing can be implemented by causing a CPU (Central Processing Unit) to execute a computer program. The above-mentioned program can be stored and provided to a computer using any type of non-transitory computer-readable media. Non-transitory computer-readable media include any type of tangible storage media. Examples of non-transitory computer-readable media include magnetic storage media (such as floppy disks, magnetic tapes, and hard disk drives), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer-readable media. Examples of transitory computer-readable media include electric signals, optical signals, and electromagnetic waves. Transitory computer-readable media can provide the program to a computer via a wired communication line, such as electric wires and optical fibers, or a wireless communication line.

(Supplementary Note 1)

A route information exchange method that exchanges, by a communication terminal, route information among a plurality of routing domains, the route information exchange method comprising:

upon receiving, by the communication terminal, a routing control message from another adjacent communication terminal, identifying whether a routing domain to which the other communication terminal belongs is identical with the routing domain of the communication terminal itself; and advertising, to the other communication terminal, route information on a routing domain other than the routing domain to which the other communication terminal belongs, out of route information held in the communication terminal itself, when the routing domain to which the other communication terminal belongs is different from the routing domain of the communication terminal itself.

(Supplementary Note 2)

The route information exchange method according to Supplementary note 1, wherein the communication terminal identifies whether the routing domain to which the other adjacent communication terminal belongs is identical with the routing domain of the communication terminal itself, and when the routing domain to which the other communication terminal belongs is identical with the routing domain of the communication terminal itself, the communication terminal advertises, to the other communication terminal, route information on the routing domain to which the communication terminal itself belongs, out of the route information held in the communication terminal itself.

(Supplementary Note 3)

The route information exchange method according to Supplementary note 1 or 2, wherein upon receiving route information from another routing domain that is identical with or different from the routing domain of the communication terminal itself, the communication terminal stores the route information as well as a routing domain corresponding to the route information.

(Supplementary Note 4)

The route information exchange method according to any one of Supplementary notes 1 to 3, wherein the identification of the routing domain is executed by comparing routing domain identification information included in a routing control message transmitted from the other adjacent communication terminal, with routing domain identification information on the communication terminal itself recognized by the communication terminal.

(Supplementary Note 5)

The route information exchange method according to Supplementary note 4, wherein the routing domain identification information for identifying the routing domain includes one of an address and an identifier of an upper cluster head communication terminal in a cluster including a cluster head communication terminal representative of the cluster and a communication terminal in the vicinity of the cluster head communication terminal, the routing domain identification information being recursively generated from a top cluster head communication terminal toward a lower cluster head communication terminal.

(Supplementary Note 6)

The route information exchange method according to Supplementary note 4, wherein the routing domain identification information is a network address assigned to each routing domain.

(Supplementary Note 7)

The route information exchange method according to Supplementary note 4, wherein the routing domain identification information is an identifier that is assigned to each routing domain and indicates a difference between routing domains.

(Supplementary Note 8)

The route information exchange method according to Supplementary note 4, wherein the routing domain identification information is an identifier indicating a difference between clusters or cluster head communication terminals to which respective routing domains belong.

(Supplementary Note 9)

The route information exchange method according to any one of Supplementary notes 1 to 8, wherein the route information includes a routing domain and a communication terminal as destination information, and information on a next hop corresponding to the destination information.

(Supplementary Note 10)

The route information exchange method according to any one of Supplementary notes 1 to 8, wherein the route information includes: a routing domain and a communication terminal as destination information; information on a next hop corresponding to the destination information; and an arrival probability indicating a possibility of arrival at a destination from the next hop.

(Supplementary Note 11)

The route information exchange method according to Supplementary note 10, wherein when route information held in the communication terminal itself is advertised to the other communication terminal, route information including at least one arrival probability higher than a predetermined threshold is advertised, out of route information recognized by the communication terminal itself, the arrival probability indicating a degree of arrival at a destination.

(Supplementary Note 12)

The route information exchange method according to Supplementary note 10 or 11, wherein the arrival probability is recalculated when route information held in the communication terminal itself is advertised to the other communication terminal.

(Supplementary Note 13)

The route information exchange method according to any one of Supplementary notes 1 to 12, wherein when route information held in the communication terminal itself is advertised to the other communication terminal, route information including at least one route information on a routing domain different from a routing domain included in a routing control message received from the other communication terminal is advertised, out of route information recognized by the communication terminal itself.

(Supplementary Note 14)

The routing control exchange method according to any one of Supplementary notes 1 to 13, wherein the routing domain includes a communication terminal which can be reached in an ad-hoc network routing protocol.

(Supplementary Note 15)

A communication terminal having a mechanism for exchanging route information among a plurality of routing domains, the communication terminal comprising:

identification means for identifying, upon receiving a routing control message from another adjacent communication terminal, whether a routing domain to which the other communication terminal belongs is identical with the routing domain of the communication terminal itself; and advertisement means for advertising, to the other communication terminal, route information on a routing domain other than the routing domain to which the other communication terminal belongs, out of route information held in the communication terminal itself, when the routing domain to which the other communication terminal belongs is different from the routing domain of the communication terminal itself.

(Supplementary Note 16)

The communication terminal according to Supplementary note 15, wherein the identification means identifies whether a routing domain to which another adjacent communication terminal belongs is identical with the routing domain of the communication terminal itself, and when the routing domain to which the other communication terminal belongs is identical with the routing domain of the communication terminal itself, the advertisement means advertises, to the other communication terminal, route information on the routing domain to which the communication terminal itself belongs, out of route information held in the communication terminal itself.

(Supplementary Note 17)

The communication terminal according to Supplementary note 15 or 16, wherein upon receiving route information from another routing domain that is identical with or different from the routing domain of the communication terminal itself, the communication terminal stores the route information as well as a routing domain corresponding to the route information.

(Supplementary Note 18)

The communication terminal according to any one of Supplementary notes 15 to 17, wherein the identification, by the identification means, of the routing domain is carried out by comparing routing domain identification information included in a routing control message transmitted from the other adjacent communication terminal, with routing domain identification information on the communication terminal itself recognized by the communication terminal.

(Supplementary Note 19)

The communication terminal according to Supplementary note 18, wherein routing domain identification information for identifying the routing domain includes one of an address and an identifier of an upper cluster head communication terminal in a cluster including a cluster head communication terminal representative of the cluster and a communication terminal in the vicinity of the cluster head communication terminal, the routing domain identification information being recursively generated from a top cluster head communication terminal toward a lower cluster head communication terminal.

(Supplementary Note 20)

The communication terminal according to Supplementary note 18, wherein the routing domain identification information is a network address assigned to each routing domain.

(Supplementary Note 21)

The communication terminal according to Supplementary note 18, wherein the routing domain identification information is an identifier that is assigned to each routing domain and indicates a difference between routing domains.

(Supplementary Note 22)

The communication terminal according to Supplementary note 18, wherein the routing domain identification information is an identifier indicating a difference between clusters or cluster head communication terminals belonging to respective routing domains.

(Supplementary Note 23)

The communication terminal according to any one of Supplementary notes 15 to 22, wherein the route information includes a routing domain and a communication terminal as destination information, and information on a next hop corresponding to the destination information.

(Supplementary Note 24)

The communication terminal according to any one of Supplementary notes 15 to 22, wherein the route information includes: a routing domain and a communication terminal as destination information; information on a next hop corresponding to the destination information; and an arrival probability indicating a possibility of arrival at a destination from the next hop.

(Supplementary Note 25)

The communication terminal according to Supplementary note 24, wherein when route information held in the communication terminal itself is advertised to the other communication terminal, route information including at least one arrival probability higher than a predetermined threshold is advertised, out of route information recognized by the communication terminal itself, the arrival probability indicating a degree of arrival at a destination.

(Supplementary Note 26)

The communication terminal according to Supplementary note 24 or 25, wherein the arrival probability is recalculated when route information held in the communication terminal itself is advertised to the other communication terminal.

(Supplementary Note 27)

The communication terminal according to any one of Supplementary notes 15 to 26, wherein when route information held in the communication terminal itself is advertised to the other communication terminal, route information including at least one route information on a routing domain different from a routing domain included in a routing control message received from the other communication terminal is advertised, out of route information recognized by the communication terminal itself.

(Supplementary Note 28)

The communication terminal according to any one of Supplementary notes 15 to 27, wherein the routing domain includes another communication terminal which can be reached from the communication terminal itself in an ad-hoc network routing protocol.

(Supplementary Note 29)

A non-transitory computer-readable medium storing a route information exchange program capable of causing a computer incorporated in a communication terminal to execute the route information exchange method according to any one of Supplementary notes 1 to 14.

This application is based upon and claims the benefit of priority from Japanese patent application No. 2011-254259, filed on Nov. 21, 2011, the disclosure of which is incorporated herein in its entirety by reference.

REFERENCE SIGNS LIST

A1 COMMUNICATION TERMINAL
A1a-A1j COMMUNICATION TERMINALS
A11 WIRELESS COMMUNICATION FUNCTION UNIT
A12 INFORMATION MANAGEMENT UNIT
A13 ROUTING CONTROL UNIT
A111 WIRELESS COMMUNICATION UNIT
A121 ROUTE INFORMATION STORAGE UNIT
A131 ROUTING CONTROL DETERMINATION UNIT
A132 DTN ROUTING CONTROL UNIT
A133 MANET ROUTING CONTROL UNIT
A134 ROUTE INFORMATION ADVERTISEMENT UNIT
AD100 HIERARCHICAL ADDRESS
AD100a1 TOP HIERARCHICAL CLUSTER HEAD TOP CH ADDRESS
AD100a2 FIRST-LAYER HIERARCHICAL CLUSTER HEAD TOP-1 CH ADDRESS
AD100a3 SECOND-LAYER HIERARCHICAL CLUSTER HEAD TOP-2 CH ADDRESS
  AD100c HASH (NODE ID)
B1 ANOTHER COMMUNICATION TERMINAL
B1a-B1d COMMUNICATION TERMINALS
C1-C9 CLUSTERS
C11-C13 CLUSTERS
C21, C22 CLUSTERS
C31-C34 CLUSTERS
CH CLUSTER HEAD
CH1 UPPER CLUSTER HEAD
CH2 LOWER CLUSTER HEAD
D101 ROUTING CONTROL MESSAGE
D102 ADVERTISEMENT INFORMATION
D201 ROUTING CONTROL MESSAGE OF ANOTHER ROUTING DOMAIN
D202 ROUTE INFORMATION ON ANOTHER ROUTING DOMAIN
D301 ROUTING CONTROL MESSAGE OF ITS OWN ROUTING DOMAIN
D302 ROUTE INFORMATION ON ITS OWN ROUTING DOMAIN
L1 WIRELESS COMMUNICATION
MANET MOBILE AD-HOC NETWORK
MANET1 MOBILE AD-HOC NETWORK
MANET2 MOBILE AD-HOC NETWORK
RD ROUTING DOMAIN
RD1-RD3 ROUTING DOMAINS
RDA, RDB ROUTING DOMAINS
RT100a MOBILE AD-HOC NETWORK MANET ROUTE INFORMATION
RT100a1 DESTINATION HIERARCHICAL ADDRESS
RT100a2 IP ADDRESS OF NEXT HOP
RT100b DTN ROUTING ROUTE INFORMATION
RT100b1 DESTINATION HIERARCHICAL ADDRESS
RT100b2 IP ADDRESS OF NEXT HOP
RT100b3 ARRIVAL PROBABILITY
RT101a MANET ROUTE INFORMATION TO BE ADVERTISED TO ANOTHER COMMUNICATION TERMINAL
RT101a1 DESTINATION HIERARCHICAL ADDRESS
RT101a2 IP ADDRESS OF NEXT HOP
RT101a3 ARRIVAL PROBABILITY
RT101b DTN ROUTING ROUTE INFORMATION TO BE ADVERTISED TO ANOTHER COMMUNICATION TERMINAL
RT101b1 DESTINATION HIERARCHICAL ADDRESS
RT101b2 IP ADDRESS OF NEXT HOP
RT101b3 ARRIVAL PROBABILITY

The invention claimed is:

1. A route information exchange method that exchanges, by a communication terminal, route information among a plurality of routing domains, the route information exchange method comprising:
  upon receiving, by the communication terminal, a routing control message from another adjacent communication terminal, identifying whether a routing domain to which the other communication terminal belongs is identical with the routing domain of the communication terminal itself; and
  advertising, to the other communication terminal, route information on a routing domain other than the routing domain to which the other communication terminal belongs, out of route information held in the communication terminal itself, when the routing domain to which the other communication terminal belongs is different from the routing domain of the communication terminal itself,
  wherein:
    the identification of the routing domain is executed by comparing routing domain identification information included in a routing control message transmitted from the other adjacent communication terminal, with routing domain identification information on the communication terminal itself recognized by the communication terminal,
    the route information includes a routing domain and a communication terminal as destination information, information on a next hop corresponding to the destination information, and an arrival probability indicating a possibility of arrival at a destination from the next hop, and
    when route information held in the communication terminal itself is advertised to the other communication terminal, the route information including at least one arrival probability higher than a predetermined threshold is advertised out of route information recognized by the communication terminal itself, the arrival probability indicating a degree of arrival at a destination.

2. The route information exchange method according to claim 1, wherein
  the communication terminal identifies whether the routing domain to which the other adjacent communication terminal belongs is identical with the routing domain of the communication terminal itself, and
  when the routing domain to which the other communication terminal belongs is identical with the routing domain of the communication terminal itself, the communication terminal advertises, to the other communication terminal, route information on the routing domain to which the communication terminal itself belongs, out of the route information held in the communication terminal itself.

3. The route information exchange method according to claim 1, wherein upon receiving route information from another routing domain that is identical with or different from the routing domain of the communication terminal itself, the communication terminal stores the route information as well as a routing domain corresponding to the route information.

4. The route information exchange method according to claim 1, wherein the routing domain identification information for identifying the routing domain includes one of an address and an identifier of an upper cluster head communication terminal in a cluster including a cluster head communication terminal representative of the cluster and a communication terminal in the vicinity of the cluster head communication terminal, the routing domain identification information being recursively generated from a top cluster head communication terminal toward a lower cluster head communication terminal.

5. The route information exchange method according to claim 1, wherein the routing domain identification information is a network address assigned for each routing domain.

6. The route information exchange method according to claim 1, wherein the routing domain identification information is an identifier that is assigned to each routing domain and indicates a difference between routing domains.

7. The route information exchange method according to claim 1, wherein the routing domain identification information is an identifier indicating a difference between clusters or cluster head communication terminals to which respective routing domains belong.

8. A non-transitory computer-readable medium storing a route information exchange program capable of causing a computer incorporated in a communication terminal to execute the route information exchange method according to claim 1.

9. The route information exchange method according to claim 1, wherein the route information includes a routing domain and a communication terminal as destination information, and information on a next hop corresponding to the destination information.

10. The route information exchange method according to claim 1, wherein the arrival probability is recalculated when route information held in the communication terminal itself is advertised to the other communication terminal.

11. The route information exchange method according to claim 1, wherein when route information held in the communication terminal itself is advertised to the other communication terminal, route information including at least one route information on a routing domain different from a routing domain included in a routing control message received from the other communication terminal is advertised, out of route information recognized by the communication terminal itself.

12. The routing control exchange method according to claim 1, wherein the routing domain includes a communication terminal which can be reached in an ad-hoc network routing protocol.

13. A communication terminal having a mechanism for exchanging route information among a plurality of routing domains, the communication terminal comprising:
an identification unit that identifies, upon receiving a routing control message from another adjacent communication terminal, whether a routing domain to which the other communication terminal belongs is identical with the routing domain of the communication terminal itself; and
an advertisement unit that advertises, to the other communication terminal, route information on a routing domain other than the routing domain to which the other communication terminal belongs, out of route information held in the communication terminal itself, when the routing domain to which the other communication terminal belongs is different from the routing domain of the communication terminal itself,
wherein:
the identification of the routing domain is executed by comparing routing domain identification information included in a routing control message transmitted from the other adjacent communication terminal, with routing domain identification information on the communication terminal itself recognized by the communication terminal,
the route information includes a routing domain and a communication terminal as destination information, information on a next hop corresponding to the destination information, and an arrival probability indicating a possibility of arrival at a destination from the next hop, and
when route information held in the communication terminal itself is advertised to the other communication terminal, the route information including at least one arrival probability higher than a predetermined threshold is advertised out of route information recognized by the communication terminal itself, the arrival probability indicating a degree of arrival at a destination.

14. The communication terminal according to claim 13, wherein the identification unit identifies whether a routing domain to which another adjacent communication terminal belongs is identical with the routing domain of the communication terminal itself, and when the routing domain to which the other communication terminal belongs is identical with the routing domain of the communication terminal itself, the advertisement unit advertises, to the other communication terminal, route information on the routing domain to which the communication terminal itself belongs, out of route information held in the communication terminal itself.

15. The communication terminal according to claim 13, wherein upon receiving route information from another routing domain that is identical with or different from the routing domain of the communication terminal itself, the communication terminal stores the route information as well as a routing domain corresponding to the route information.

16. The communication terminal according to claim 13, wherein the identification, by the identification unit, of the routing domain is carried out by comparing routing domain identification information included in a routing control message transmitted from the other adjacent communication terminal, with routing domain identification information on the communication terminal itself recognized by the communication terminal.

17. The communication terminal according to claim 16, wherein routing domain identification information for identifying the routing domain includes one of an address and an identifier of an upper cluster head communication terminal in a cluster including a cluster head communication terminal representative of the cluster and a communication terminal in the vicinity of the cluster head communication terminal, the routing domain identification information being recursively generated from a top cluster head communication terminal toward a lower cluster head communication terminal.

* * * * *